Oct. 7, 1969   F. J. JANNETT   3,471,098
APPARATUS AND METHOD FOR WINDING TAPES ONTO MANDRELS
Filed Jan. 10, 1968   17 Sheets-Sheet 1
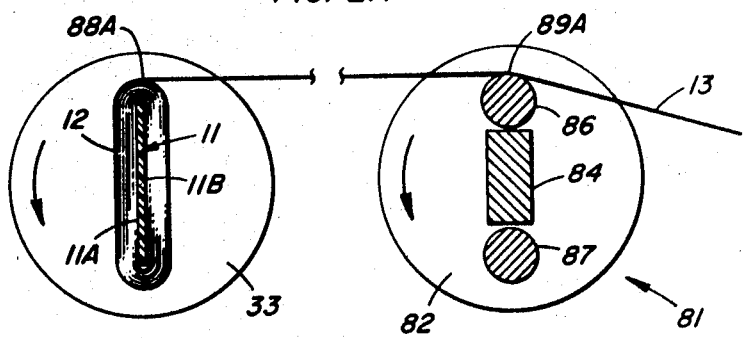
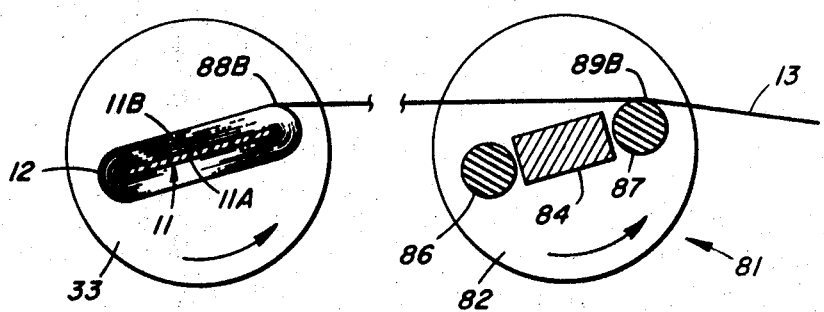
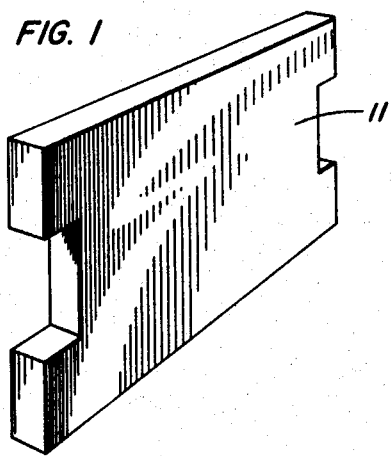
INVENTOR
F. J. JANNETT
BY R. P. Miller
ATTORNEY

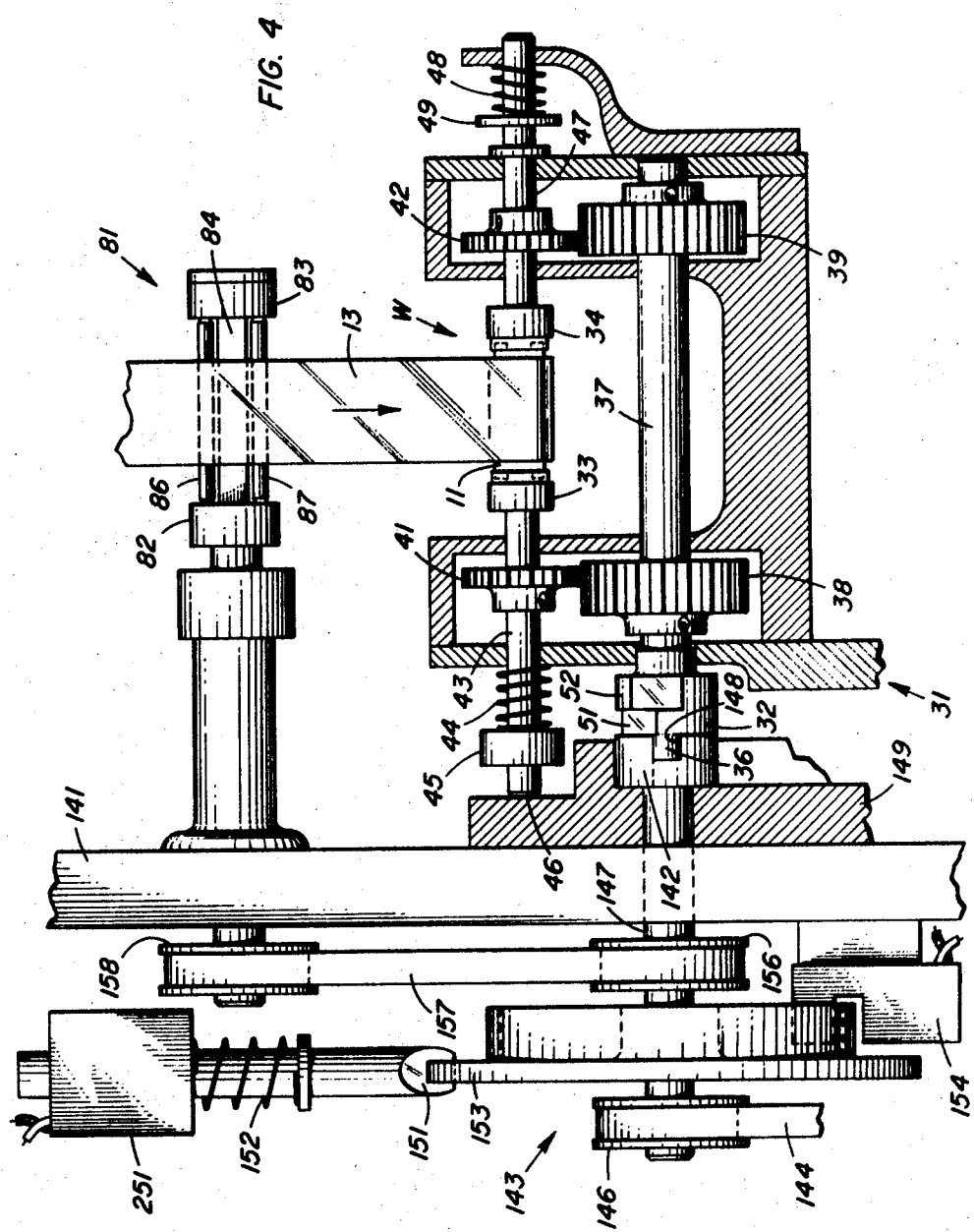

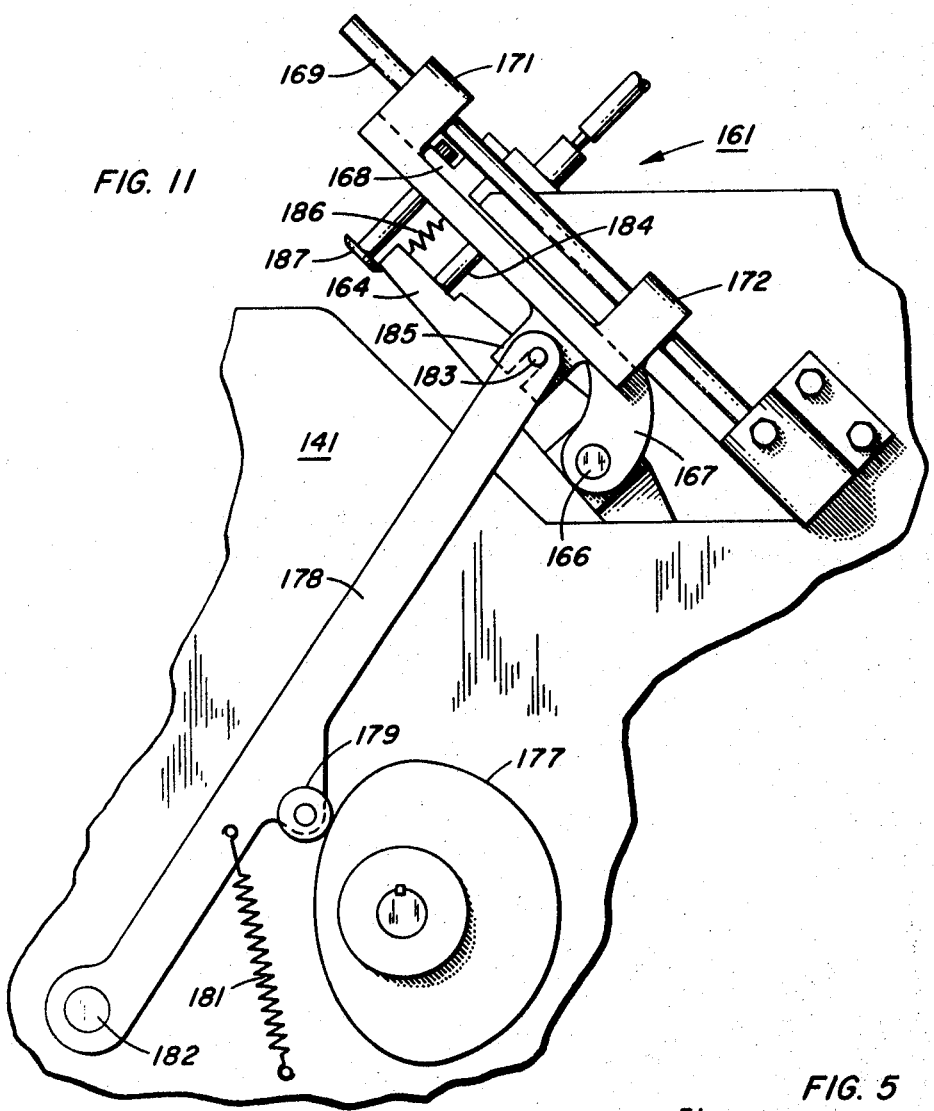
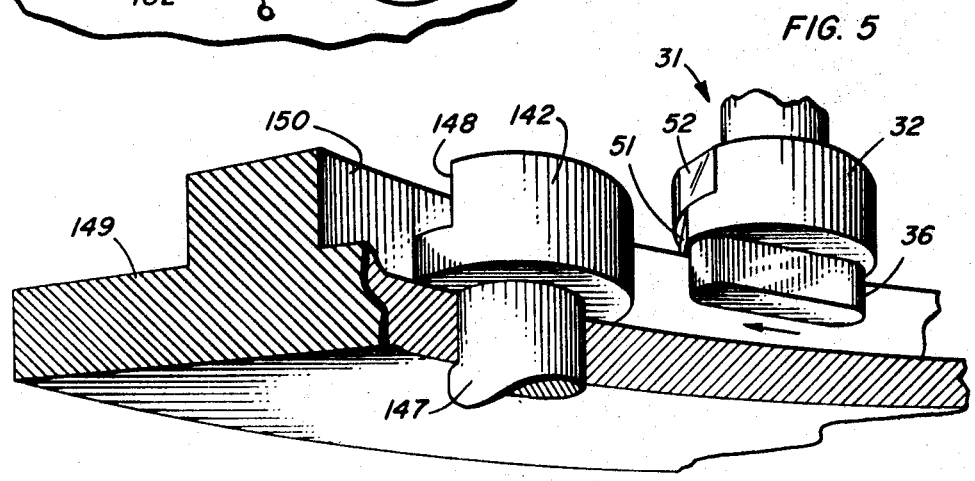

United States Patent Office 3,471,098
Patented Oct. 7, 1969

3,471,098
APPARATUS AND METHOD FOR WINDING TAPES ONTO MANDRELS
Frederick Joseph Jannett, West Millington, N.J., assignor to Western Electric Company, Incorporated, New York, N.Y., a corporation of New York
Filed Jan. 10, 1968, Ser. No. 696,914
Int. Cl. B65h 39/16, 81/06, 77/00
U.S. Cl. 242—56.1                             15 Claims

ABSTRACT OF THE DISCLOSURE

Strands of tape are wound onto flat mandrels indexed successively to a winding station for manufacturing flat capacitor blanks. The mandrels are thin, light-weight dielectric plates which form with the tapes finished wound capacitor blanks. A rotating programmer substantially eliminates fluctuations in tape tension, thereby minimizing stress on the mandrels during winding. Tape severing, tape attaching, and heat-sealing mechanisms operate after winding to finish a capacitor blank and to attach the tapes to a newly indexed mandrel.

BACKGROUND OF THE INVENTION

In the manufacture of wound capacitors, it is known to produce capacitors by winding metal-coated tapes about substantially cylindrical mandrels. Such mandrels, usually composed of a pair of separate semicircular sectors brought together along their flat portions, are removed from within the wound tapes after winding. Thereafter, the convolutions of tape are crushed to provide flat, finished capacitor blanks. Due to the crushing operation, however, nonuniformities are often introduced into the finished capacitors in the form of voids, wrinkles, and mechanical mutilations. As a result, the mechanical and electrical characteristics of the capacitors may be adversely affected.

SUMMARY OF THE INVENTION

The invention contemplates the provision of a method and an apparatus for winding strand while controlling the tension in the strand, and more particularly, to manufacturing flat capacitor blanks by winding capacitor tapes onto thin, light-weight dielectric plates which are included in the finished capacitors. The need for a crushing operation is thereby eliminated.

In order to permit the winding of capacitor tapes onto mandrels in the form of thin plates of light-weight dielectric material without fracturing or severely deforming the plates, the method and apparatus for performing the method involve the provision of mechanisms for maintaining substantially constant the tension in the tapes during winding. The substantial elimination of fluctuations in tape tension adjacent a plate during winding is accomplished through the use of a rotating programmer having predetermined dimensions related to those of the plate.

A capacitor winding apparatus constructed in accordance with the invention and for performing the method thereof includes mechanisms for continuously winding capacitor blanks by indexing a succession of flat dielectric plates into a winding station, attaching a pair of metal-covered dielectric capacitor tapes to each newly indexed plate, winding the tapes under uniform tension onto each plate, successively severing the tapes, and heat sealing each capacitor blank with several additional turns of an outer tape wound over an inner tape.

BRIEF DESCRIPTION OF THE DRAWING

FIG. 1 is an isometric view of a thin, light-weight dielectric plate constituting a mandrel onto which a pair of capacitor tapes are to be wound by apparatus constructed in accordance with the invention;

FIGS. 2A and 2B are side elevational views partly in section, illustrating a partially wound capacitor blank and demonstrating successive stages in the operation of a rotating programmer for maintaining constant tension in a capacitor tape being wound onto a mandrel to form the capacitor blank, in accordance with the invention and for practicing the method thereof;

FIG. 4 is a top view, partly in section, illustrating a mandrel retained in one of several chucking assemblies on the turret and showing a tape winding, and programmer rotating, drive mechanism forming a part of the apparatus;

FIG. 5 is an isometric view of a slotted drive member and of a driven member with a mating tang projecting therefrom, the two members forming part of the drive mechanism shown in FIG. 4;

FIG. 11 is a rear elevational view showing additional parts of the operating linkage for the tape attaching mechanism;

DETAILED DESCRIPTION

The capacitor blank

Referring now to FIGS. 1, 2A, 2B, 3, and 12, flat capacitors 10 (FIG. 12) are to be wound on a mandrel, such as the mandrel 11 (FIG. 1). Other mandrel configurations may, of course, be advantageously used in place of the mandrel 11. The illustrated mandrel 11 is a thin, generally rectangular plate of a light-weight dielectric material, coated with a pressure sensitive adhesive.

A finished capacitor blank consists of two overlapping strands, strips, or sheets of a tape 12 (FIG. 2A) wound a predetermined number of times about the mandrel 11 and held fastened thereto. The tape 12 may be composed of a commercial dielectric film, for example, the film polyethylene terephthalate, sold under the trademark "Mylar." A conductive metal, such as aluminum or zinc, is deposited onto the "Mylar" film. The metallic coating does not cover the entire width of the tape, but, rather terminates at a distance spaced from a different edge for each tape. Thus, each edge of a wound capacitor blank is formed, in part, by a different metallic conductor deposited on one or the other of the tapes.

General outline of a capacitor blank winding apparatus

Figure 3:
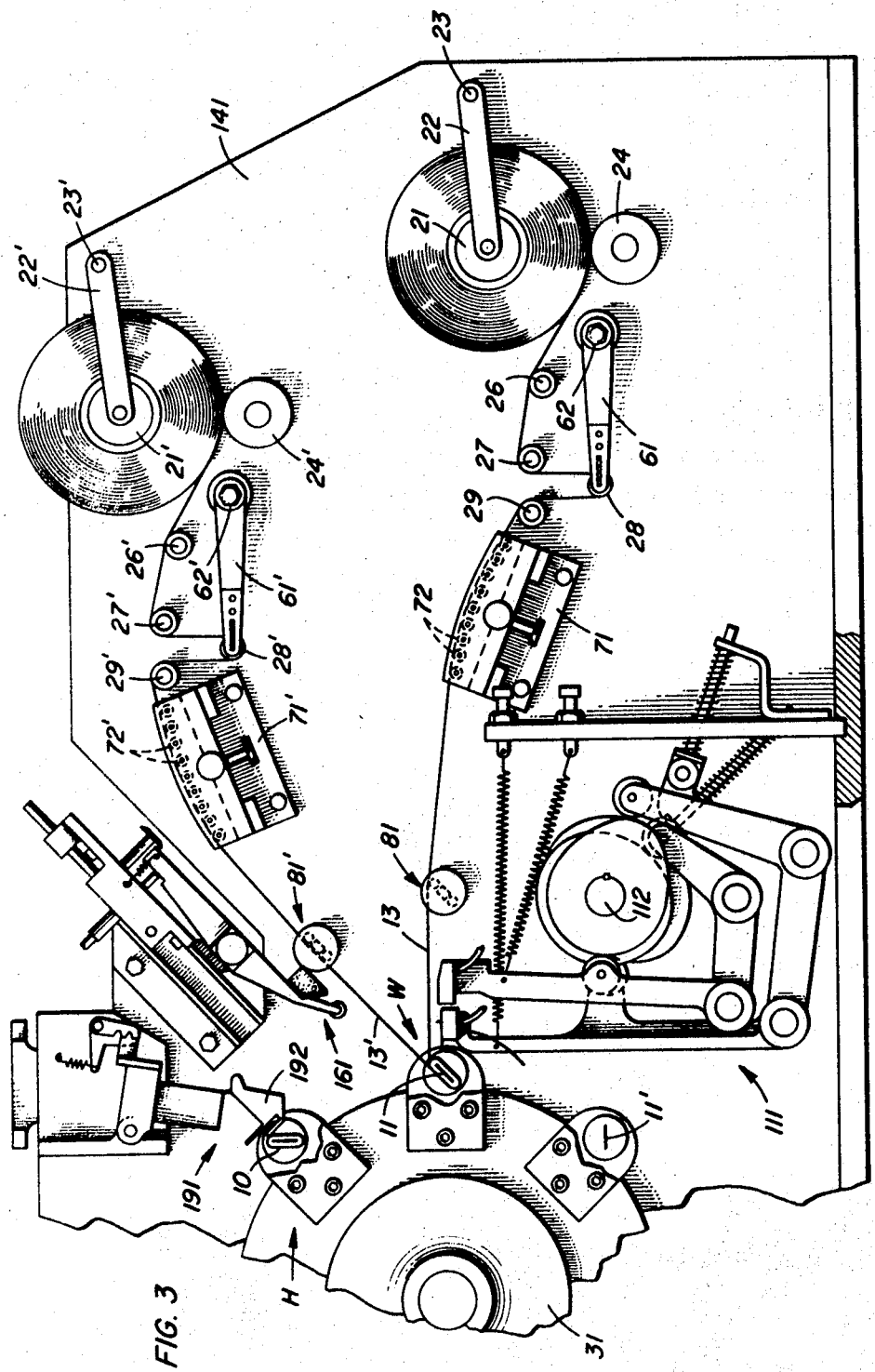
FIG. 3 is a side elevational view of a capacitor blank winding apparatus according to the invention, with parts broken away, showing tape tensioning mechanisms, a tape cutting mechanism, a tape attaching mechanism, a heat-sealing mechanism and part of an indexing turret.

Turning now to FIG. 3, there is shown an apparatus for winding capacitor blanks with two overlapping layers of convolutions of tape, an inner tape 13 and an outer tape 13′, originating from a pair of spools 21 and 21′, respectively. A plurality of pressure sensitive, adhesive-coated mandrels 11, 11′, etc. onto which the tapes are to be wound are circumferentially arrayed on an indexing turret or carrier 31. The adhesive may be "painted" directly onto the mandrels or may be located on a strip of tape which is initially secured to each mandrel, whereafter a tape liner is stripped off to expose the adhesive. One of the mandrels 11 on the turret 31 is located at a winding station W. The tape 13 emanating from the supply spool encounters a tension-maintaining jockey or pivot arm 61, a registration track 71 and a tape guiding programmer 81 before reaching the mandrel 11 at the winding station W. Similar elements 61′, 71′, and 81′ are encountered by the advancing tape 13′. A tape cutting mechanism 111 and a tape attaching mechanism 161, both associated with the winding station W, a heat-sealing mechanism 191, located at an overwinding and heat-sealing station H constituting a receiving station, and a supporting frame 141 also form part of the apparatus.

Referring now to FIGS. 4 and 5, the mandrel 11 is mounted at the winding station W between a pair of chucking plates 33 and 34 carried by the turret 31. A driven member 32, also carried by the turret 31, is connected to rotate the chucking plates when engaged with a drive member 142 (see also FIG. 16) carried on the supporting frame 141. A stationary, variable speed winding motor 140 (FIG. 15) of a conventional type is connected through a drive train 143 to rotate the drive member 142.

Figure 12:
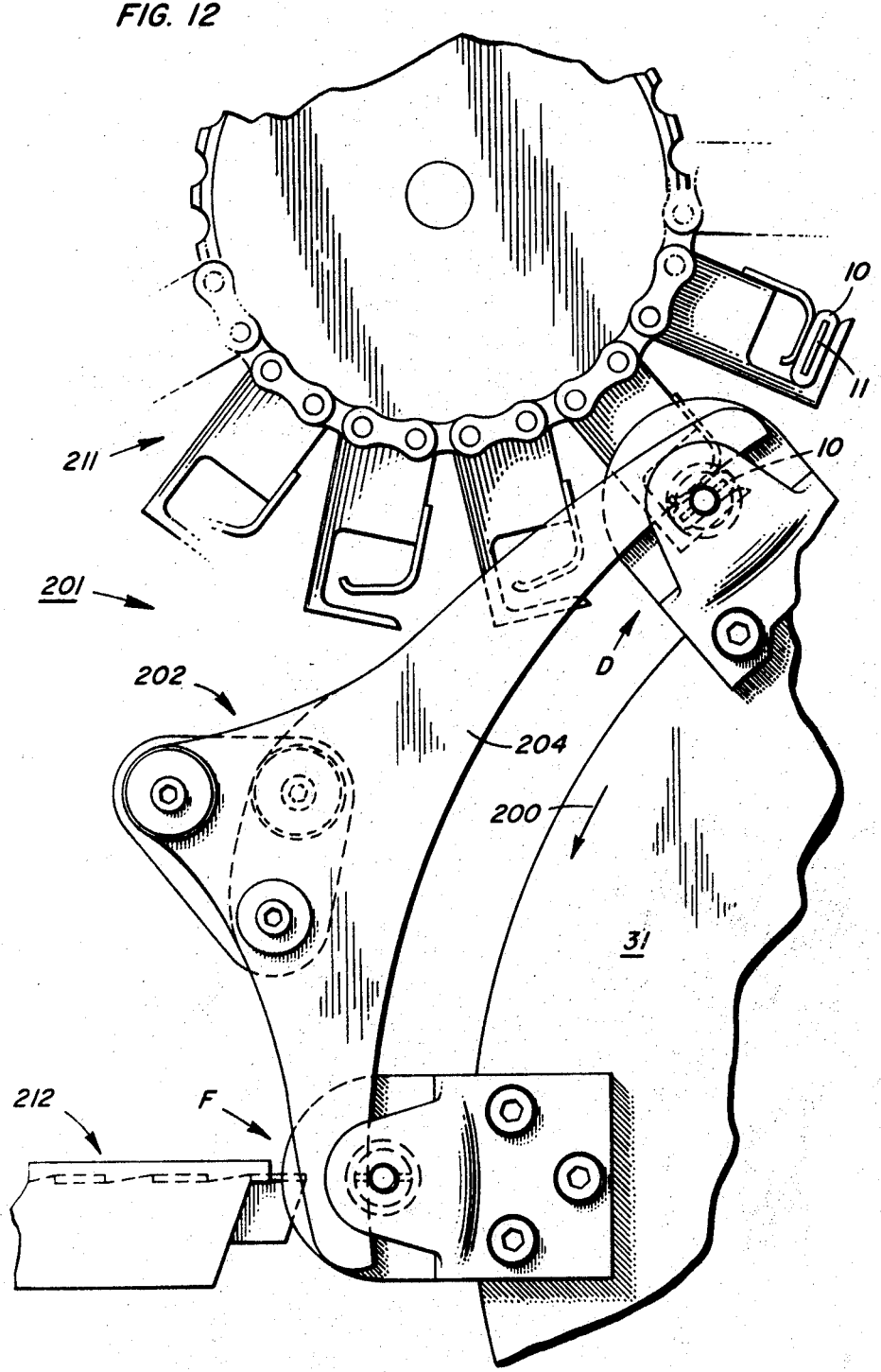
FIG. 12 is a side elevational view of a mandrel feeding, and wound capacitor blank discharging, mechanism used in the apparatus.
Figure 13:
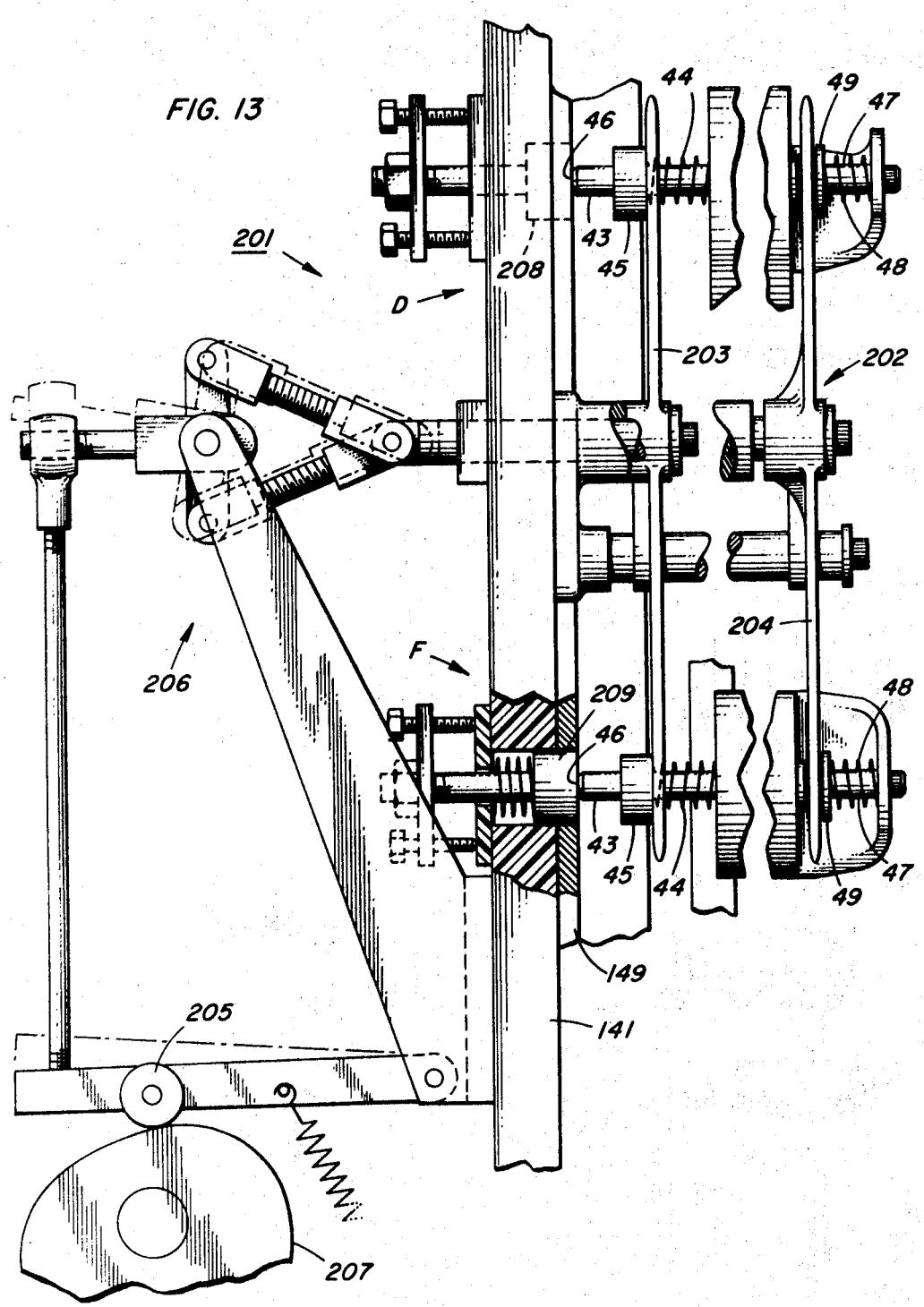
FIG. 13 is an end elevational view of the mandrel feeding, and wound capacitor blank discharging, mechanism illustrating an actuating linkage therefor.

A mandrel feeding and wound capacitor blank discharging mechanism 201, used with the above-outlined apparatus, is illustrated in FIGS. 12 and 13.

Turret and winding assembly

The winding motor 140, the drive train 143, and the drive member 142 (FIGS. 4, 5 and 16) are all mounted on the frame 141 adjacent the winding station W. The drive member 142 is situated adjacent the turret 31. The drive train includes a belt 144, driven from the motor 140 and operable to rotate a pulley 146. The pulley 146 is fixed to a shaft 147 to which the drive member 142 is also fixed. A slotted portion 148 of the drive member 142 provides an opening into which a mating tang 36 on the driven member 32 projects to engage the driven member with the drive member.

A plurality of pairs of similar chucking assemblies, including that associated with the pair of chucking plates 33 and 34 shown at the winding station W, are positioned about the circumference of the turret or carrier 31 at equally spaced locations for retaining the mandrels 11, 11′, etc. (FIG. 3). Only the chucking assembly for retaining the mandrel 11 between the chucking plates 33 and 34 and for rotating these chucking plates is hereinafter described, all the other assemblies being identical thereto.

The driven member 32 (FIG. 4) having the tang 36 projecting therefrom is fixed to a rotatable shaft 37 carried by the turret 31. A pair of spaced gears 38 and 39 are keyed to the shaft 37 to rotate therewith. The gears 38 and 39 are continuously engaged with a pair of pinions 41 and 42, respectively. The pinion 41 and the chucking plate 33 are both mounted on a chucking plate shaft 43 to rotate therewith. The chucking plate shaft 43 is axially biased by a spring 44, engaging a flange 45, to hold an end 46 of the shaft remote from the chucking plate 33 in contact with the stationary supporting frame 141 as the turret 31 is rotated about its axis (see also FIG. 3) by conventional indexing drive mechanisms. Axial movement of the chucking plate shaft 43 with the pinion 41 continuously engaging the gear 38 is permitted by the width of the gear 38. Alternatively, the pinion 41 may be of large width or a splined connection may permit axial lost motion between the pinion 41 and the chucking plate shaft 43, the pinion 41 then being retained against axial movement. Another chucking plate shaft 47, axially movable in the same manner as the chucking plate shaft 43, carries the pinion 42 and the chucking plate 34. A spring 48 contacts a flange 49 to bias the chucking plate shaft 47 and the chucking plate 34 axially toward the chucking plate 33 in order to retain the mandrel 11 between the two chucking plates.

With this arrangement of parts, the winding motor 140 (FIG. 15) is connected to rotate the mandrel 11 when the mandrel is at the winding station W and the tang 36 on the driven member 32 is engaged within the slotted portion 148 of the drive member 142. The drive connection is by way of the belt 144, the pulley 146, the shaft 147, the drive member 142, the driven member 32, the shaft 37, the gears 38 and 39, the pinions 41 and 42, the chucking plate shafts 43 and 47, and the chucking plates 33 and 34.

The intermittent indexing movements of the turret or carrier 31 (FIG. 3) must move the tang 36 (FIGS. 4 and 5) associated with each new mandrel indexed to the winding station W into engagement with the slotted portion 148 of the drive member 142. Then, after the winding of the tapes 13 and 13′ onto the mandrel at the winding station W, a successive indexing movement of the turret 31 must disengage the driven member 32 from the drive member 142. A camming ring 149 (FIGS. 4, 5, 16 and 16A through 16E) and a solenoid-controlled stopping tang 151 (FIG. 4) control the attitude of the driven member 32 and the drive member 142, respectively, from the termination of the winding of a mandrel to the start of a subsequent winding operation on another, newly indexed mandrel. These controls permit the required engagement and disengagement of the drive and driven members, also controlling the orientation of the various driven members 32 during indexing. Note the various positions of the wound capacitors and mandrels shown in dotted lines about the periphery of the camming ring 149 in FIG. 16.

Located on each drive member 32 are one or more cam following surfaces 51, 52, etc., as shown in phantom lines in FIGS. 16A–16E. A lateral surface of the tang 36 preferably forms one of the cam following surfaces. The camming ring 149 constitutes an extension of the supporting frame 141 running adjacent the entire circumference of the turret 31. The camming ring has one or more camming surfaces, e.g., surfaces 150, 150′, 150″, equal in number to that of the cam following surfaces 51, 52, etc., on the driven member 32. Effective portions of the camming surfaces on the camming ring 149 are serially positioned about the periphery thereof to be successively engaged by associated cam following surfaces 51, 52, etc., on each driven member 32 as the turret 31 is indexed. The driven member 32 is, thus, appropriately positioned at all indexing stations. Note that, in FIG. 5, the camming surface 150 of the ring 149 engages a lateral surface of the tang 36 to guide the tang into the slotted portion 148 of the drive member 142 as indexing occurs in the direction of the arrow. Note, too, that once the tang engages the slotted portion of the drive member, the driven member 32 will be free to be rotated by the drive member 142, no camming surface on the supporting frame 141 interfering with such rotation.

Figure 15:
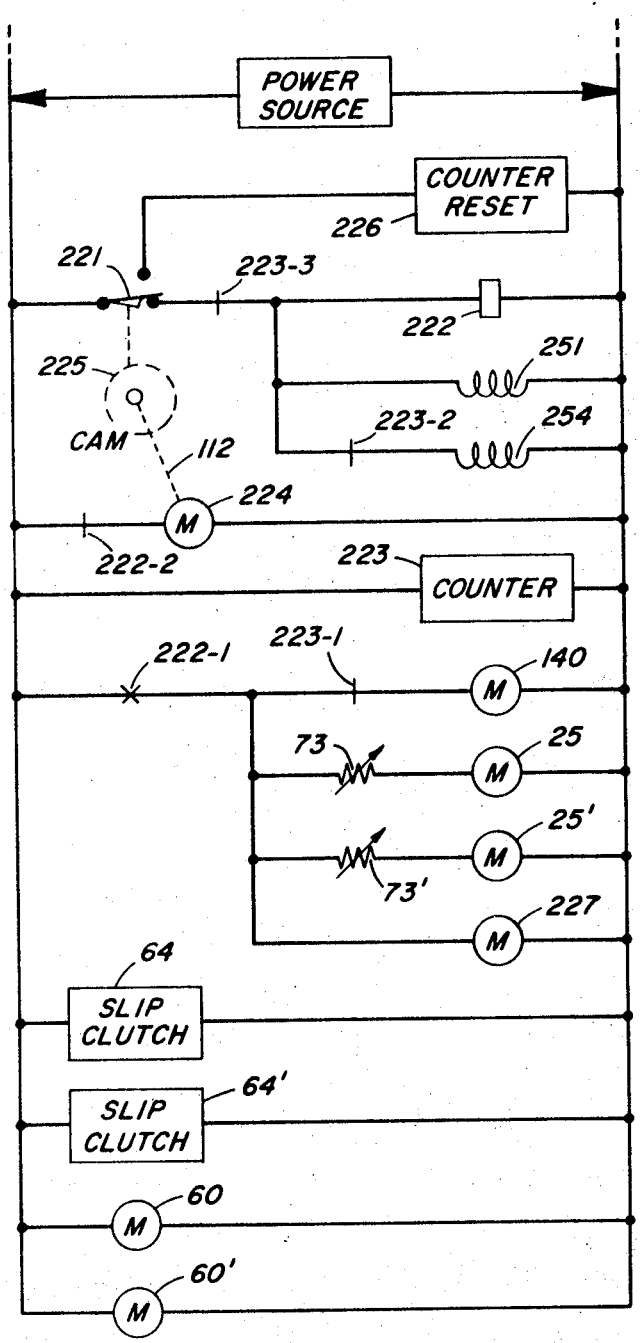
FIG. 15 is a simplified control circuit for operating the apparatus.
Figure 16:
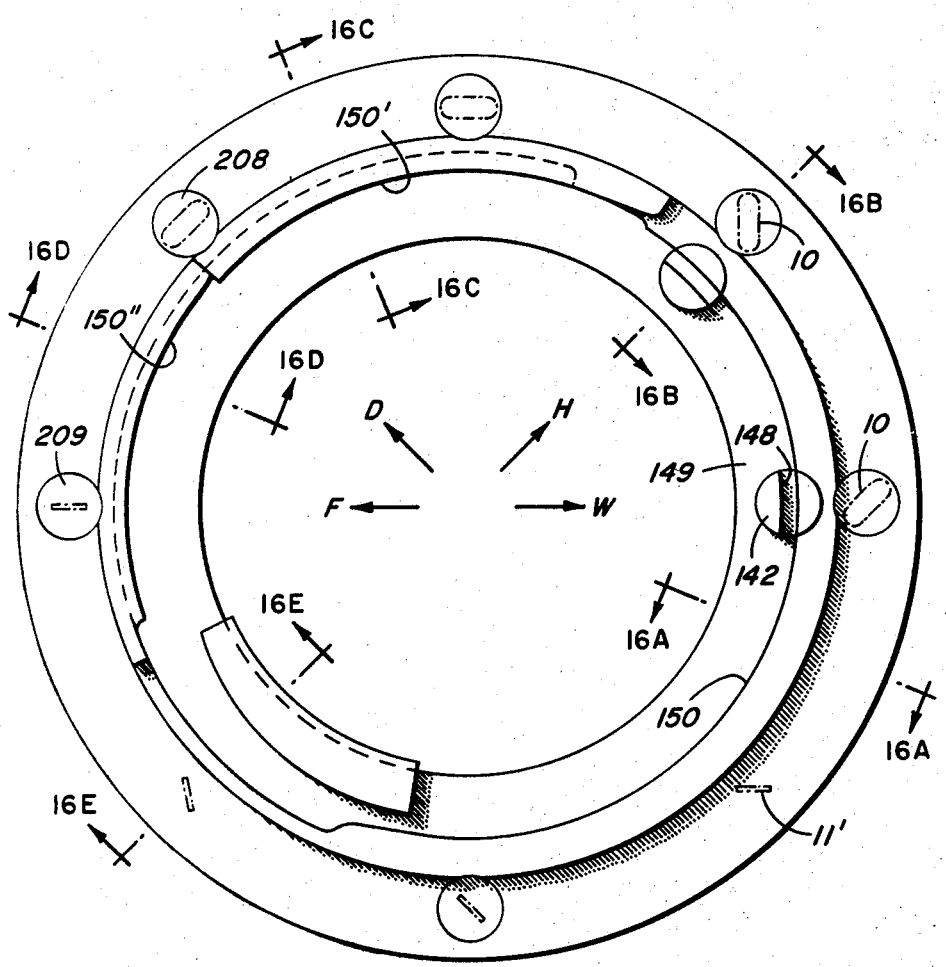
FIG. 16 is a side elevational view of a portion of a supporting frame, showing a camming ring for continuously orienting the driven member of FIG. 5 in predetermined positions during indexing of the turret.
Figure 16A:
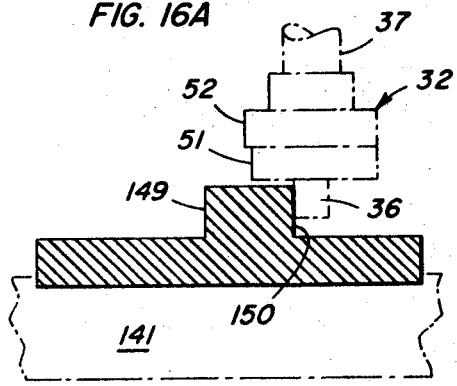
FIGS. 16A through 16E are views, partly in section, taken along the lines 16A—16A through 16E—16E of FIG. 16, showing various camming and cam following surfaces on the camming ring and the driven member, respectively.

The stopping tang 151 (FIG. 4) acts upon the cessation of winding a capacitor blank in cooperation with a brake 154 to stop the drive member 142 in correct position for disengagement of the drive member 32. The stopping tang also functions in cooperation with the brake to hold the stopped drive member correctly positioned for subsequent engagement with the next driven member indexed to the winding station W. A spring 152 biases the stopping tang 151 into normal stopping engagement in an indented peripheral portion of a brake disc 153. The brake disc is fixed to the shaft 147. Upon the energization of a release solenoid 254 (FIG. 15) of the brake 154 (FIG. 4) and the disengagement of the stopping tang 151 from the brake disc 153, the shaft 147 is freed to rotate. Disengagement of the stopping tang is occasioned by the energization of a stopping tang release solenoid 251 (FIG. 15). When the solenoid 251 is deenergized and, simultaneously, the release solenoid 254 of the brake 154 is deenergized, the spring 152 holds the stopping tang engaged with the brake disc 153. The brake disc, in turn, holds the shaft 147 stationary with the drive member 142 in the correct indexing position shown in FIG. 5.

Figure 16B:
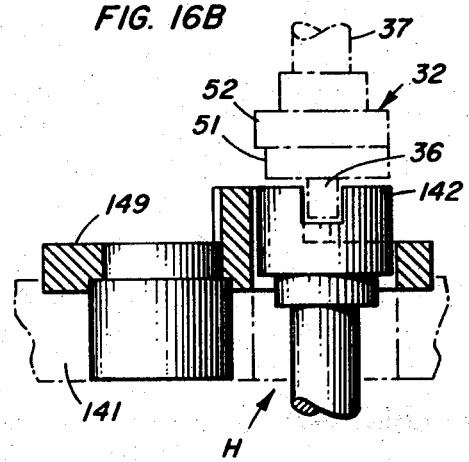
Figure 16C:
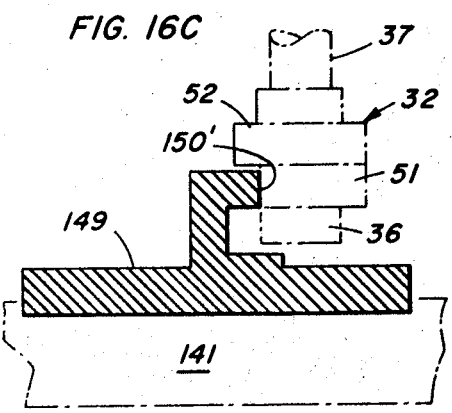
Figure 16D:
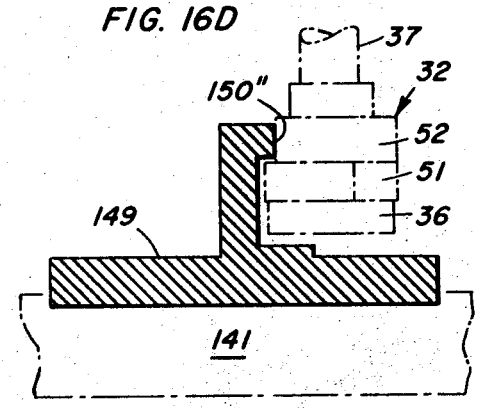
Figure 16E:
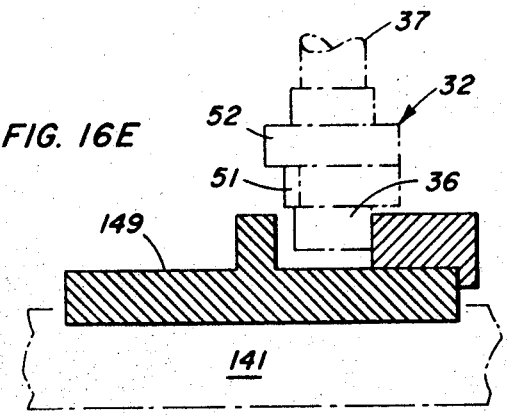

Similar winding mechanisms and a similar stopping tang assembly are present at the overwinding and heat-sealing station H shown in FIG. 16B.

Tape pay-off and tensioning

Returning to FIG. 3, the spool 21 is mounted on a pivot arm 22 which pivots about a pintle 23. A pay-off roller 24 is located generally below the spool 21 in a position whereat the weight of the pivotally mounted spool holds the outermost convolution of the tape 13 on the spool against the pay-off roller. A variable speed pay-off motor 25 (FIG. 15) is connected to rotate the pay-off roller 24 so as to feed the tape 13 toward the winding station W. As the tape unwinds from the spool 21, the pivotal mounting thereof allows the weight of the spool to continuously maintain the outermost tape convolution pressed against the pay-off roller 24. Thus, rotation of the roller 24 continues to feed the tape 13 toward the winding station W, at a linear velocity independent of the effective radius of the tape 13 on the spool, as tape is depleted from the spool 21.

Figure 6:
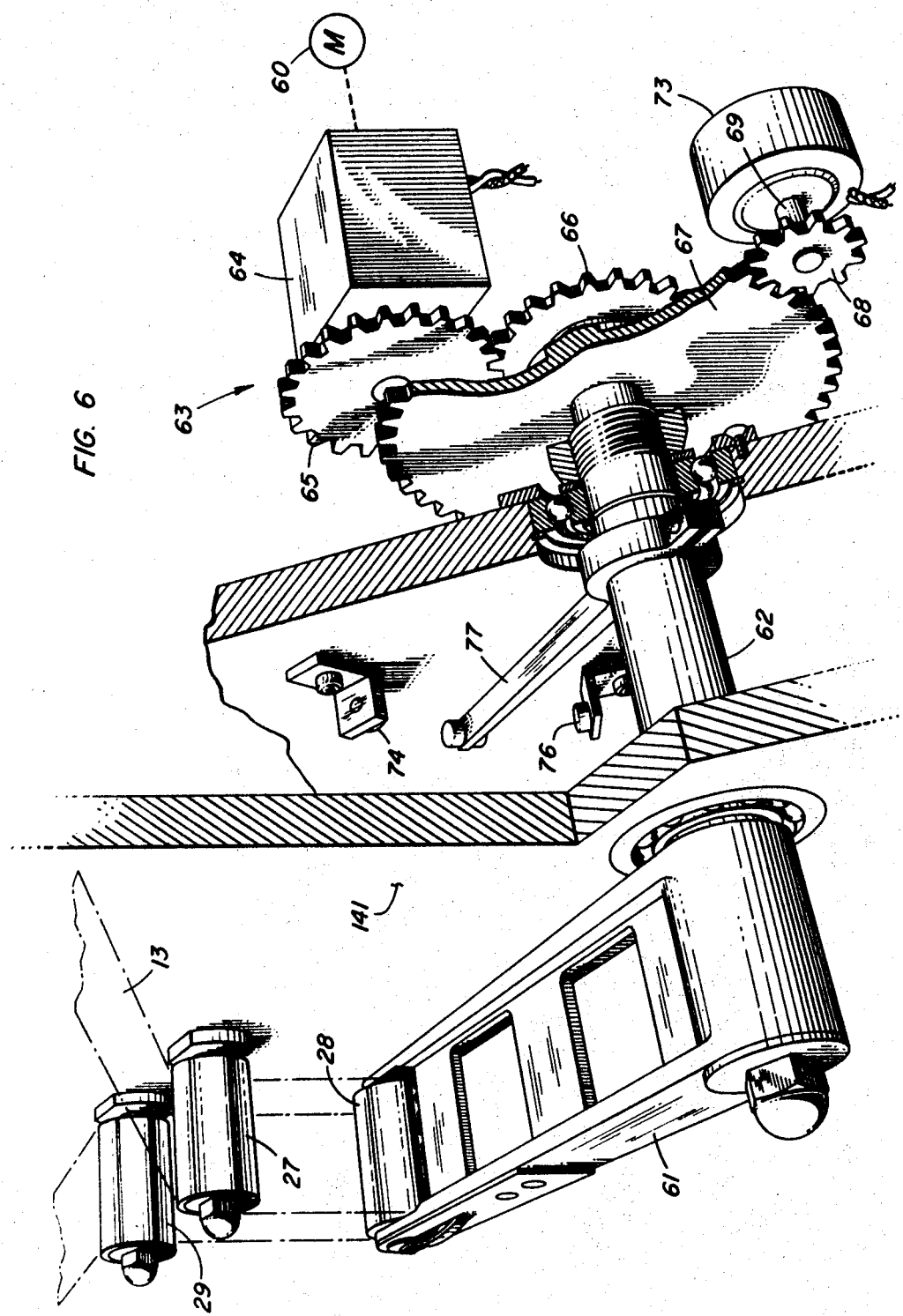
FIG. 6 is an isometric view, with parts broken away, illustrating a tape tension-maintaining and pay-off speed-controlling system forming a part of the apparatus.

A pair of guide rollers 26 and 27 are located to contact the tape 13 between the pay-off roller 24 and the jockey arm 61. A similar guide roller 29 is positioned between the jockey arm 61 and the registration track 71. The jockey arm is connected at one end to a jockey arm shaft 62, projecting through the supporting frame 141, to pivot with angular movement of the shaft. At the other end of the jockey arm, a jockey arm roller 28 is rotatably mounted. The tape 13 contacts the jockey arm roller 28 between the rollers 27 and 29 to form a partial loop about the jockey arm roller. The length of this loop will increase or decrease as the jockey arm 61 is pivoted downwardly or upwardly, acting as a sensing mechanism for a tension-maintaining control system 63 (FIG. 6).

The control system 63 includes a motor 60 (see also FIG. 15) which is connected through a torque control unit 64 to apply a constant torque to a gear 65. The torque control unit 64 preferably consists of a conventional adjustable slip clutch (FIG. 15). The torque applied to the gear 65 may be adjusted by varying the field current or voltage applied to the slip clutch of the torque control unit 64. The gear 65 is engaged continuously with another gear 66 which is fixed to the jockey arm shaft 62. Thus, regardless of the angular position of the jockey arm 61, a constant torque will be applied thereto from the slip clutch of the torque control unit 64 through the gears 65 and 66 and the jockey arm shaft 62. The constant torque on the jockey arm tends to maintain a constant tension in the tape 13 partially looped about the jockey arm roller 28.

A pay-off speed control gear 67 is also fixed to the jockey arm shaft 62 and is in continuous engagement with a pinion 68. The pinion is mounted on a rheostat control shaft 69 extending from a rheostat 73 (see also FIG. 15). The angular position of the shaft 69 controls the variable resistance of the rheostat. The rheostat 73 acts as a variable load on the pay-off motor 25 (FIG. 15) associated with the pay-off roller 24, acting to control the rotational speed thereof.

The above-described arrangement is adjusted by means of the rheostat 73 and the slip clutch of the torque control unit 64 such that any increase or decrease in the speed of the winding motor 140 (FIG. 15), driving the belt 144 (FIG. 4), is reflected by a similar increase or decrease in the speed of the pay-off motor 25. This results in a minimization of variation in the length of tape between the pay-off roller 24 and the winding station W with a concomitant minimization of variation in tape tension. Any increase or decrease in tape tension caused by an increase or decrease in the winding speed will cause an upward or downward movement of the jockey arm 61. This will occur as the length of the partial loop of tape 13 about the rollers 27, 28, and 29 decreases or increases under influence of the tension-maintaining control system 63. The varied position of the jockey arm 61 and the jockey arm shaft 62 varies the resistive load of the rheostat 73 on the pay-off motor 25, through a change in angular position of the gear 67, the pinion 68, and the rheostat control shaft 69. Thus, the operating speed of the pay-off motor 25 is varied so as to remain proportional to that of the winding motor 140.

A pair of stops 74 and 76 may be used in cooperation with a stop arm 77 to limit the pivotal movement of the jockey arm 61. The stop arm 77 is fixed to the jockey arm shaft 62.

An identical tape pay-off and tension-maintaining control system may be used for the tape 13'. The elements thereof shown in FIGS. 3 and 15 are identified by primed reference numerals, otherwise identical to those used with similar elements associated with the tape 13.

From the roller 29 (FIG. 3), the tape 13 traverses the registration track 71 before reaching the programmer 81. The registration track includes a plurality of parallely extending, arcuately arrayed rollers 72 over which the tape passes. This type of registration track is more fully shown in FIGS. 22 and 23 of United States Patent No. 3,278,130 to F. J. Jannett. The rollers provide a convex, arcuate path for the tape in order to maintain the tension therein. The registration track 71' is identical to the registration track 71.

The programmer

Figure 8A:
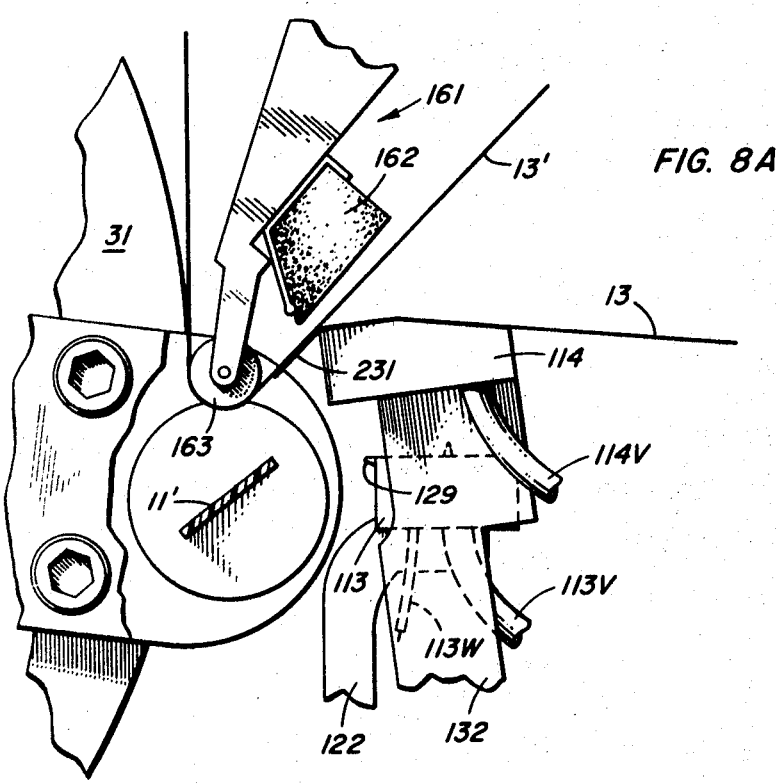
FIGS. 8A and 8B are side elevational views of successive stages in operation of parts of the tape cutting mechanism and the tape attaching mechanism.

The tape guiding programmer 81, identical to the programmer 81', is best illustrated by FIGS. 8A, 2B, and 4. The programmer 81 is connected to be rotated by a pulley 158 (FIG. 4), driven by the shaft 147 through a pulley 156 and a belt 157, at a rotational speed equal to that of the chucking plate shafts 43 and 47. The belt 157 may also be connected to rotate the other programmer 81'. The programmer 81 is rotatably mounted and includes a pair of end plates 82 and 83 connected by a flat central member 84. A pair of rotatably mounted programming rollers or guide rods 86 and 87 extend between the plate 82 and the plate 83. The programming rollers are spaced along a diameter of the programmer 81 at equal distances from the center thereof. The diameter of each of the programming rollers or rods 86 and 87 is approximately equal to the average thickness of a capacitor blank during winding. The spacing between the programming rollers positions the most diametrically outward points on the rollers apart by a distance approximately equal to the average width of a capacitor blank during winding. Thus, the shape of the programmer 81 conforms generally to that of a capacitor blank during winding.

The programmer 81 is rotated about the central axis thereof, parallel to the longitudinal central axis of the mandrel 11, by the pulley 158 (FIG. 4), simultaneously with the mandrel 11 being rotated about its longitudinal central axis at the winding station W. The programmer 81 and the mandrel 11 are rotated at the same speed, with the diameter of the programmer which includes the programming rollers 86 and 87 kept constantly parallel to elongated flat surfaces 11A and 11B (FIGS. 2A and 2B) of the rectangular mandrel 11. Thus, the extremities of the programmer 81 and the mandrel 11 are continuously maintained parallel.

Upon winding of the tape 13 onto the mandrel 11, the tape will contact each of the programming rollers or rods 86 and 87 for approximately 180° of rotation of the programmer 81. The rollers guide and control the laying of tape onto the mandrel. The distance between the point of contact of the tape 13 with a programming roller and the point of contact of the tape 13 with the accumulated windings on the mandrel 11 is maintained substantially constant by the parallel rotation. For example, the distance between the contact points 88A and 89A in FIG. 2A is equal to that between the contact points 88B and 89B in FIG. 2B.

Due to the continuous angular alignment of the programmer 81 with the mandrel 11 and the absence of significant length fluctuations between the contact points, the tension in the tape 13 remains substantially constant as the tape is guided by the programmer 81 and is wound upon the mandrel 11. Any variations from constant tension are minimized by the correspondence of the width and thickness of the area defined by the programming rollers 86 and 87 and the space therebetween to the average width and thickness of a flat capacitor during winding. Stresses on the thin dielectric material of which the mandrel is composed are, therefore, reduced, lessening the likelihood of a failure of the fragile material. Obviously, a single flat programming member with curved ends or a programming member having a different shape might replace the programming rollers 86 and 87 in winding flat capacitor blanks and blanks having the different shape, respectively. Moreover, in operations wherein more than two tapes are wound onto a mandrel, an equal number of programmers may similarly be used to substantially eliminate any fluctuations in tape tensions during winding. Alternatively, a single rotating programming member might be encountered by two or more tapes prior to their being wound in overlapping relationship on a mandrel spaced from the programming member.

Briefly reviewing the method of winding one or more strips or tapes onto a plate or mandrel herein disclosed, the method involves rotating the plate 11 about an axis thereof in order to wind the strip or strips thereon. The rotating of the plate thereby tensions the strip or strips. Performed simultaneously is a step of rotating one or more guiding or programming members 81, of a shape generally similar to that of the plate and of the other guiding members, while the tensioned strip or strips continuously contact the guiding member or members at a position spaced from the rotating plate, with the guiding member 81 maintained continuously parallel to the rotating plate 11. This method, while suited to winding strips onto any plate or mandrel, is particularly adapted for use with mandrels of a fragile nature, such as thin, lightweight dielectric plates.

Tape cutting mechanism

In passing from the guiding programmers 81 and 81' into overlapping relationhip on the mandrel 11, the tapes 13 and 13' pass over the tape cutting mechanism 111. The tape cutting mechanism 111 is shown in FIG. 3 in its normal rest position. During the winding operation, the cutting mechanism remains in this rest position with the tapes 13 and 13' not contacted by any part thereof.

Turning now to FIGS. 7A through 7D, the cutting mechanism 111 includes a cam shaft 112 with cams 116, 117, 118, and 119 keyed thereto. Followers 116A, 117A, 118A, and 119A are associated wtih these cams, respectively. Cam 116 and follower 116A control the vertical movement of a vacuum head 113. Cam 117 and follower 117A control the vertical movement of another vacuum head 114. Cam 118 and follower 118A control the horizontal movement of the vacuum head 113, while cam 119 and follower 119A control the horizontal movement of the vacuum head 114. A rocker arm 121 and a link 122, connected by a pin 123, transmit cam-programmed movements to the vacuum head 113. The rocker arm 121 pivots about a fixed pin 124. A compression spring 126 and a tension spring 127 maintain the followers 116A and 118A in contact with the surfaces of their respective cams. A similar rocker arm 131 and link 132, similar pins 133 and 134, and similar springs 136 and 137 are associated with the vacuum head 114.

A source of reduced pressure, hereinafter referred to as vacuum (not shown), is connected to each of the vacuum heads 113 and 114 through fluid lines 113V and 114V, respectively. A micrometallic porous plate is used as the top surface of each of the vacuum heads. Thus, upon contacting one of these heads, the tape 13 will be retained in contact with the porous top surfaces thereof by suction when vacuum is applied to the head. A pair of valves (not shown) are used to control the application of vacuum independently through the fluid lines 113V and 114V. The vacuum head 113 carries a pair of knives 128 and 129. The knife 128 is electrically heated through a wire 113W, preferably being held at about 250° C. and then pulsed to higher temperature immediately prior to cutting. Alternatively, other cutting mechanisms may be used, such as cam actuated blades or electrically heated elements for melting through the tapes.

Tape attaching mechanism

Figure 9:
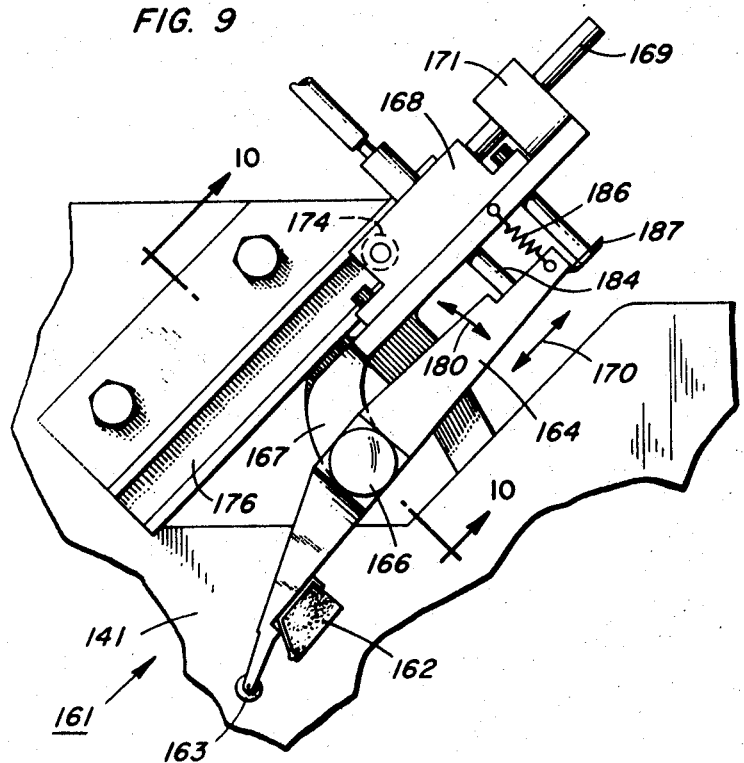
FIG. 9 is a front elevational view showing the complete tape attaching mechanism.
Figure 10:
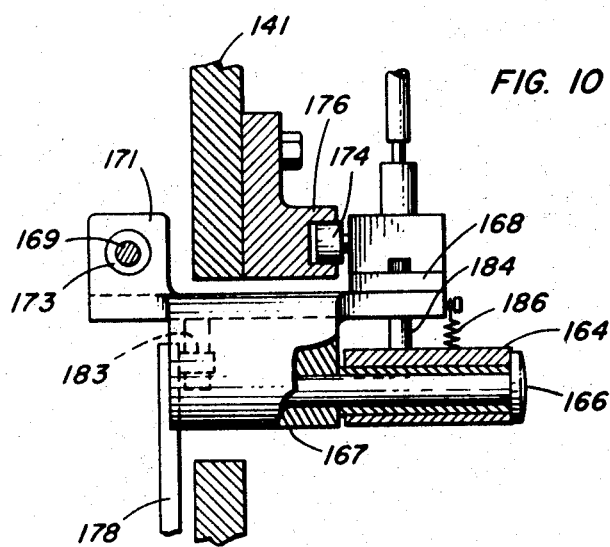
FIG. 10 is an end elevational view, partly in section, of parts of an operating linkage for the tape attaching mechanism.

Referring next to FIGS. 9–11, the tape attaching mechanism 161 includes an anvil pad 162, preferably of a resilient substance such as rubber, and a tape-extending roller 163, both mounted on a lever 164. The lever is mounted to pivot about a pin 166 which extends from a support arm 167. The support arm carries a platform 168 on one side thereof and a pair of bracket members 171 and 172 (FIG. 11) on an opposite side thereof. A rod 169 extends through sleeve bearings 173 in the brackets 171 and 172 to provide a slide mounting for the bracketed side of the support arm 167. One or more rollers 174 are carried by the platform 168 for movement along a trackway 176 to provide a slide mounting for the platform side of the support arm 167. Both the rod 169 and the trackway 176 are mounted on the supporting frame 141.

Sliding movements of the support arm 167 to reciprocate along the rod 169 and the trackway 176 in the direction of arrow 170 (FIG. 9) are occasioned by a cam 177 (FIG. 11) operating a follower arm 178. A follower 179 is carried on the arm 178 and is maintained in constant contact with the surface of the cam by a tension spring 181. One end of the follower arm 178 is pivotally mounted on the supporting frame 141 by a pin 182. Another pin 183 on the other end of the follower arm 178 fits within a slotted yoke 185, attached to the base of the support arm 167, for reciprocating the arm.

An actuating rod 184 projects from the lever 164 in a substantially perpendicular direction longitudinally spaced from the pivot pin 166. A conventional pneumatic piston and cylinder actuator (not shown), with cyclically controlled operation through cam-operated valving cyclically pressurizing alternated sides of the piston, provides cyclical pivotal movement to the lever 164 in the direction of arrow 180 (FIG. 9) through the actuating rod 184. Alternatively, a cam may directly contact a follower surface on the actuating rod 184. A spring 186 and stop member 187 cooperate with the actuating rod to pivotally position the lever 164.

Reviewing, briefly, pivotal movements of the lever 164 about the pin 166 (arrow 180) are caused by cyclical reciprocating movements of the cam-controlled actuating rod 184, acting against the bias of spring 186. Reciprocating movements of the lever 164 (arrow 170) result from pivotal movements of the follower arm 178 (FIG. 11) about the pin 182 as the cam 177 is rotated.

Mandrel feeding and wound capacitor blank discharging

Turning to FIGS. 12 and 13, the mandrel feeding and wound capacitor blank discharging mechanism 201 is shown. A chuck spreader 202 extends between a mandrel feeding station F and a wound capacitor blank discharge station D. The chuck spreader consists of a pair of parallel plates 203 and 204. A spreader linkage 206, including a rotary cam follower 205, is operable under the control of a chuck spread cam 207, which is driven from the cam shaft 122 (FIG. 3). The spreader linkage is operable to move the plates 203 and 204 between two longitudinal positions thereof. In a "closed" position, illustrated in FIG. 13, the plates are less spread apart from one another than in an "open" position.

Referring now to FIG. 4, the springs 44 and 48 are each shown bearing against the flange 45 or 49 on the chucking plate shaft 43 or 47, respectively. The spring 48 appropriately positions the chucking plate shaft 47 for holding the chucking plate 34 closed about the mandrel 11. The spring 44 holds the end 46 of the chucking plate shaft 43 against the supporting frame 141 to normally position the chucking plate 33 in correct "closed" position. With the chucking plates in this normal "closed" position, indexing of the turret 31 in the direction of the arrow 200 (FIG. 12) to bring the mandrel to the discharge station D after winding and sealing, will position the apparatus as shown in FIG. 13. Note that the plates 203 and 204, presently in "closed" position, are located adjacent the inward faces of the flanges 45 and 49, that is the faces thereof nearest the chucking plates (FIG. 4). Since the parallel plates 203 and 204 span the space between the discharge station D and the feeding station F, the same is true at the feeding station.

Adjacent both the discharge station and the feeding station, a spring plunger assembly 208 or 209 (see also FIG. 16) is located in the supporting frame 141 so as to contact the end 46 of the shaft 43. Thus, separation of the plates 203 and 204 by the linkage 206 may occur upon the indexing of each successive chucking assembly to the discharge and feeding stations D and F. Compression of the springs 48 and of the springs of the spring plunger assemblies 208 and 209 permits such separation into an "open" position. Upon the "opening" of the plates 203 and 204, any suitable, intermittently operable discharge mechanism, such as the rotary pick-off mechanism 211 (FIG. 12) may be used to pick off wound capacitor blanks 10 from the separating chucking plates 33 and 34 at the discharge station D. Then, as the plates 203 and 204 are returned to their normtal "closed" positions, a new mandrel may be fed to a position between the closing pair of chucking plates 33 and 34 at the feeding station F by any suitable intermittently operable feeding mechanism, such as the conveyor mechanism 212.

Alternatively, other feeding and discharging mechanisms, of known type, may be used in the apparatus.

Operation of the apparatus

In describing the operation of the apparatus, it is initially assumed that an indexing movement of the turret 31 (FIG. 3) has just been completed and that a new mandrel 11 is at the winding station W. The tapes 13 and 13' are presently attached to the mandrel, and the winding motor is engaged for the start of winding.

A control circuit (FIG. 15) includes a limit switch 221 associated with a relay 222. The switch 221, which is operated by a cam 225 on the cam shaft 112, is now closed.

Thus, current is supplied to energize the relay 222, as well as the stopping tang release solenoid 251 (see also FIG. 4) and the release solenoid 254 for the brake 154. A normally open contact 222–1 of the relay 222 is now closed, energizing the winding motor 140 and the pay-off motors 25 and 25'. The shaft 147 (FIG. 4) begins to rotate.

The shaft 147 accelerates to a constant winding speed, driving the chucking plate shafts 43 and 47 through the driving member 142, the driven member 32, the shaft 37, the gears 38 and 39, and the pinions 41 and 42. Thus, rotation of the shaft 147, driven by the winding motor 140, rotates the mandrel 11 about its longitudinal axis. The programmers 81 and 81' are also rotated upon rotation of the shaft 147, being driven through the pulley 156, the belt 157, and either the pulley 158 for rotating the programmer 81 or a similar pulley (not shown) for rotating the programmer 81'.

As the mandrel 11 is rotated, the tapes 13 and 13' are drawn onto the mandrel. The tapes are wound about the mandrel with the tape 13' constituting an outer tape continually overlapping the tape 13, which constitutes an inner tape. Increases in the tension in the tape 13, due to the acceleration in winding speed, are fed back over the programmer 81 and the registration track 71 (FIG. 3) to shorten the length of tape in the partial loop about the jockey arm roller 28 between the roller 27 and the roller 29. The jockey arm 61, thus, is pivoted upwardly, rotating the jockey arm shaft 62 through part of one rotation. The movement of the jockey arm shaft varies the resistance of the rheostat 73 (FIG. 6) through the gear 67, the pinion 68, and the rheostat control shaft 69. The pay-off motor 25 (FIG. 15) for rotating the pay-off roller 24 (FIG. 3), therefore, follows the operation of the winding motor 140, accelerating from rest to a constant operating speed in paying-off the tape 13 from the spool 21. Thus, undue increases in tension in the tape 13, due to acceleration of the winding motor, are avoided. The pay-off of the tape 13' from the spool 21' is similarly controlled through movements of the jockey arm 61'.

Rotating in continuous alignment with the mandrel 11, the programmer 81 continuously acts to guide the laying of the tape 13 onto the mandrel. Since the distance between the contact point of the tape 13 with the programmer 81 and contact point of the tape 13 with the mandrel 11 remains continuously constant (compare FIG. 2A with FIG. 2B), fluctuations in tape tension adjacent the mandrel 11 during winding are substantially eliminated. A similar effect results from the operation of the programmer 81' on the tape 13'. Thus, excessive stresses on the thin mandrel are avoided.

The rotation of the mandrel 11 at the winding station W continues to wind the tape 13 and 13' about the mandrel. Tape tension is maintained continuously between the pay-off roller 24 and 24' (FIG. 3) and the mandrel 11 by the rollers 26 through 29 or 26' through 29', the convexedly-curved registration track 71 or 71', and the programmer 81 or 81'. The tapes 13 and 13' on the spools 21 and 21' continuously maintain a condition wherein their outer convolutions are in contact with the pay-off rollers 24 and 24', respectively, providing controlled pay-off of the tapes by operation of the jockey arms 61 and 61' and the associated control systems. A conventional electronic counter 223 (FIG. 15) continuously indicates the number of turns of the winding motor 140, corresponding to the number of convolutions of the tapes 13 and 13' wound onto the mandrel 11. The counter is of a type operable to open a plurality of normally closed contacts as predetermined numbers of turns are indicated.

After a first predetermined number of rotations of the mandrel 11, as indicated by the counter 223, a normally closed counter contact 223–1 opens and the winding motor 140 is deenergized. A second normally closed counter contact 223–2 also opens, deenergizing the release solenoid 254 to commence engagement of the brake 154. The first predetermined number of rotations is so selected that the shaft 147 (FIG. 4), the mandrel 11, the programmers 81 and 81', and the interconnecting gearing all decelerate to a stop with a predetermined number of total windings of tapes 13 and 13' on the mandrel 11. Reduced tension in the partial loops about the jockey arm rollers 28 and 28' results in a similar deceleration of the pay-off motors 25 and 25'.

During the final decelerating turn of the mandrel 11, the counter 223 again operates to open another normally closed counter contact 223–3, thereby deenergizing the stopping tang release-solenoid 251. The stopping tang 151 is now moved by the spring 152 into engagement with the indented peripheral portion of the brake disc 153. The stopping tang cooperates with the brake 154 to stop the drive member 142 and the driven member 32 in proper position to be disengaged upon the start of indexing of the turret 31. The opening of counter contact 223–3 also deenergizes the relay 222, causing the contact 222–1 to open and thereby deenergizing the pay-off motors 25 and 25'.

The deenergization of the relay 222 also causes a contact 222–2 thereof to close. The closed contact 222–2 provides a current path to a motor 224 for rotating the cam shaft 112 (FIGS. 3, 7A–7D, and 15). Also driven by the motor 224 through various conventional drive trains (not shown) are the tape attaching mechanism advance cam 177 (FIG. 11), the chuck spread cam 207 (FIG. 13), a cam for indexing the turret 31 to bring a new mandrel to the winding station W, and valve control cams for cyclical application of vacuum to the vacuum heads and for pivoting the tape attaching mechanism 161 through the actuating rod 184 (FIG. 11). The operative sequence of the effective lift portions of these cams associated with the motor 224 is shown in FIG. 14.

Figure 14:
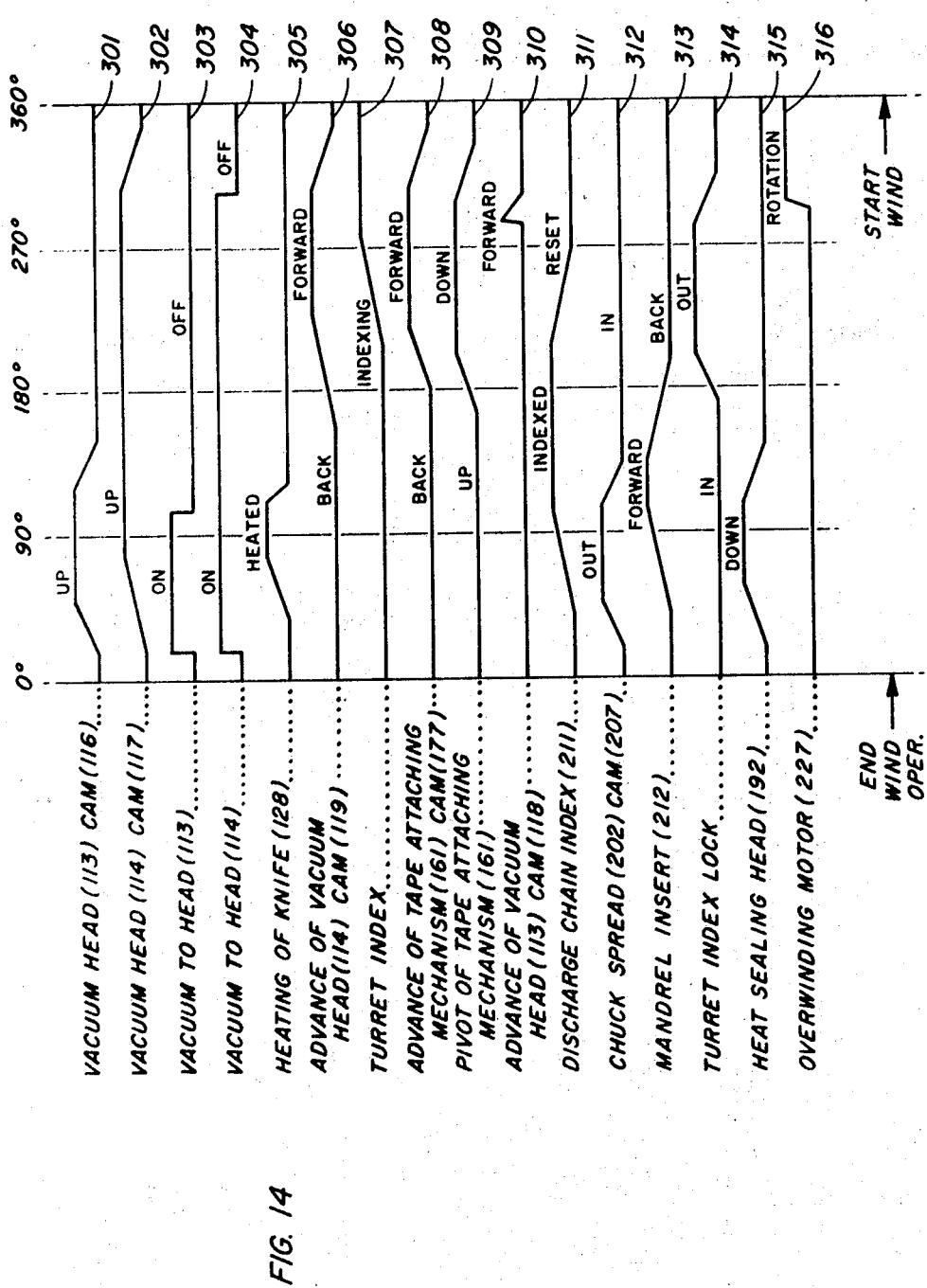
FIG. 14 is a timing chart illustrating the sequence of operation of various elements of the apparatus during the period between the winding of successive capacitor blanks.

Turning now to the timing chart of FIG. 14, prior to the start of indexing of the turret 31 (curve 307), valve-controlled application of vacuum to the vacuum heads 113 and 114 (curves 303 and 304) through fluid lines 113V and 114V is begun. An electrical heating pulse (curve 305) is applied to the knife 128 through wire 113W to raise its temperature above the normal 250° C. value thereof. As the vacuum heads 113 and 114 are raised (curves 301 and 302) by the cams 116 and 117 (FIG. 7A), the hot knife 128 severs the tape 13. Vacuum application to head 113 (curve 303) is then ceased by cam-controlled operation of a valve (not shown) in fluid line 113V, and the vacuum head 113 is lowered (curve 301). A tab portion 231 of tape 13 (FIG. 7A) now extends forwardly from the vacuum head 114. The tape 13 is held by vacuum applied to the head 114 and is advanced toward the winding station W by pivoting of the head (curve 306) through the operation of the cam 119. The tape attaching mechanism 161, meanwhile, begins simultaneous advancing and pivoting movements toward an operating position (curves 308 and 309). The apparatus is now in the condition shown in FIG. 7A, with indexing of the turret 31 (curve 307) commencing upon the unlocking of a detent-type turret index lock (curve 314).

Upon the start of indexing, the limit switch 221 is opened by cam 225 (FIG. 15). A counter reset solenoid 226 is energized thereby, resetting the counter 223 to zero. The contacts 223–1, 223–2 and 223–3 are returned to the normal closed conditions thereof.

Figure 7A:
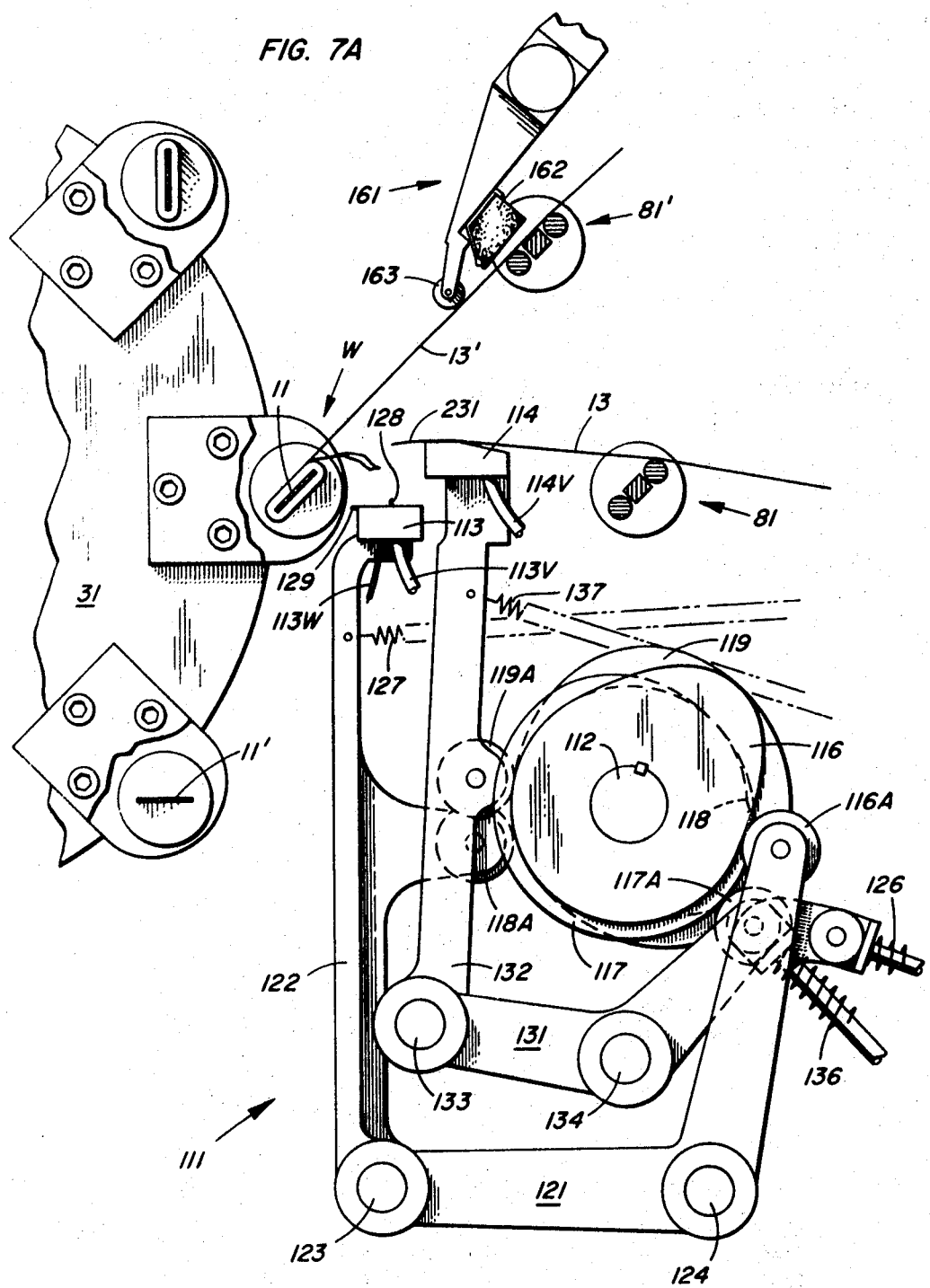
FIGS. 7A through 7D are side elevational views showing successive stages in operation of the tape cutting mechanism and parts of the tape attaching mechanism.
Figure 7B:
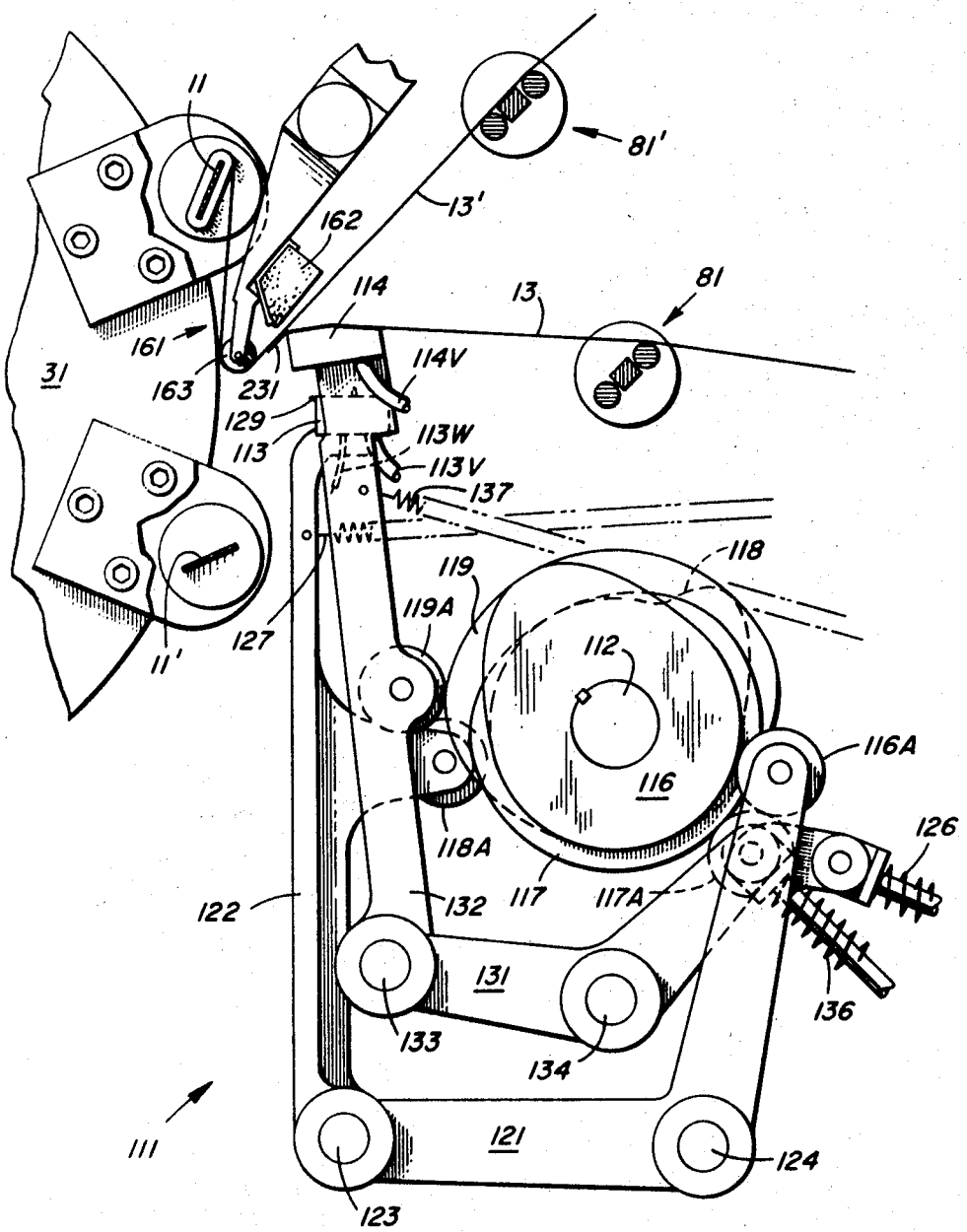

As the turret is indexed (curve 307), the tape attaching mechanism 161 (curves 308 and 309) and the vacuum head 114 (curve 306) continue their movements toward the winding station W (see FIGS. 7B and 8A). The tab 231 and the tape 13 advance with the vacuum head 114 to the winding station. The tape 13', which is still attached to the mandrel 11, is advanced by the indexing of the turret 31 toward the heat sealing mechanism 191 (FIG. 3) at a second winding or receiving station H. Simultaneously, the advance of the tape attaching mechanism 161 causes the tape-extending roller 163 to engage a trailing section of the tape 13' and to move it back toward the winding station W and across the path of mandrel indexing provided by the turret 31. Indexing of the turret, meanwhile, advances another new mandrel 11' toward the winding station W.

Figure 7C:
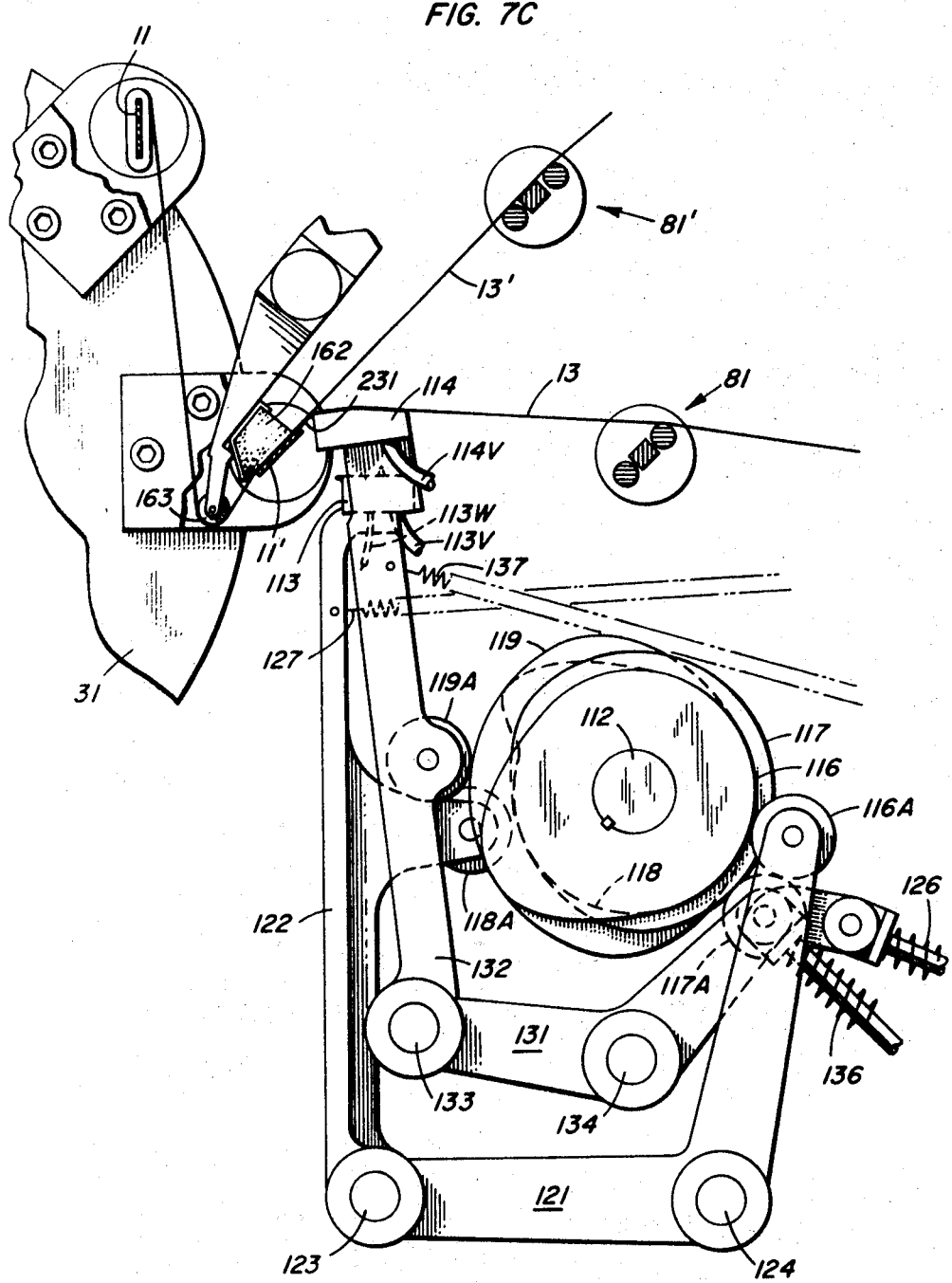
Figure 7D:
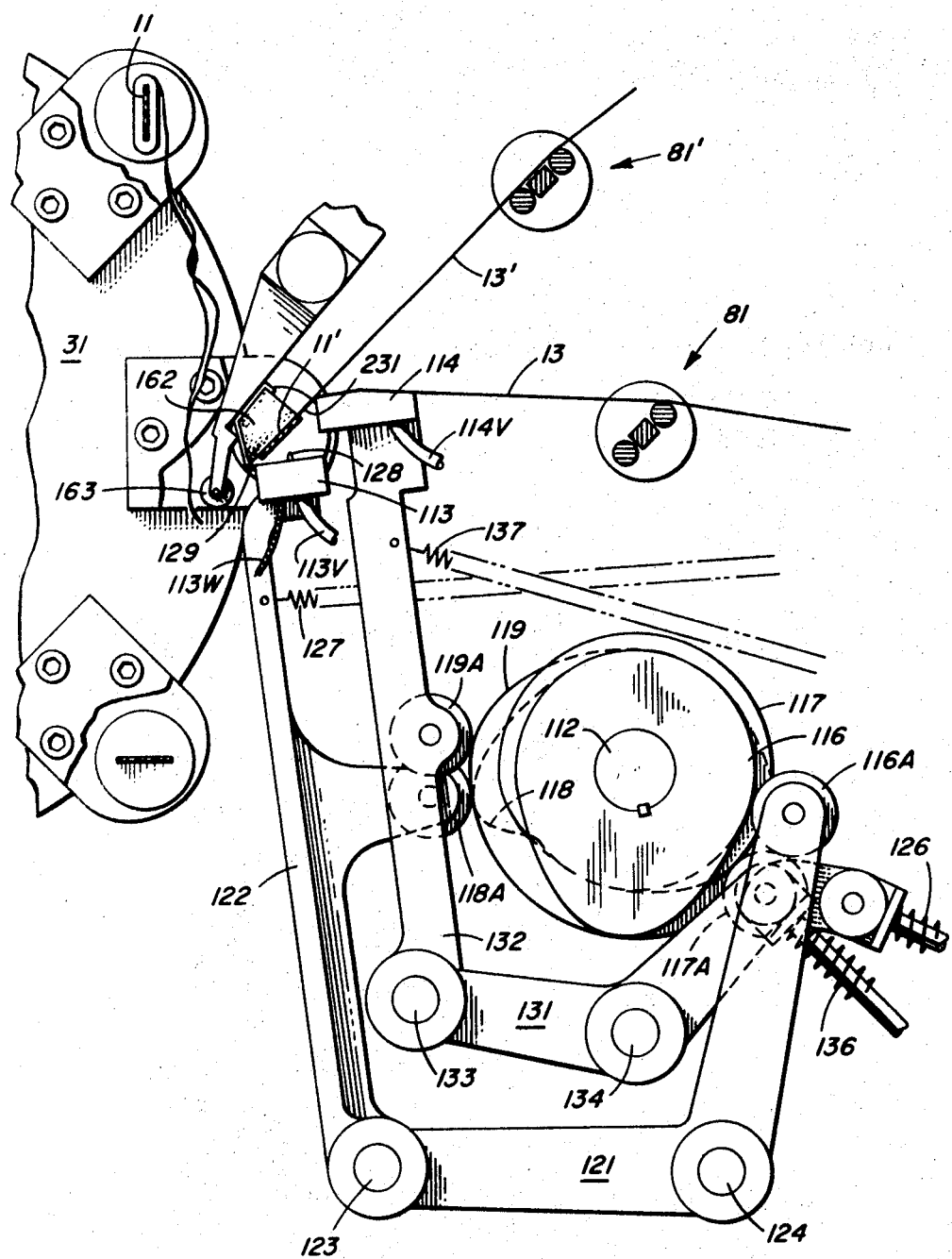

As the operating condition of FIG. 7C is attained, the tab 231 on the tape 13, the tape 13', and the anvil pad 162 on the tape attaching mechanism 161, and the mandrel 11' all reach the winding station W. The tape 13' and the tab 231 overlap the anvil pad as a final portion of the indexing movement (curve 307) presses the adhesive-coated mandrel 11' against the resilient anvil pad. The pressure between the anvil pad and the mandrel attaches both of the tapes 13 and 13', the former through the tab portion 231, to the mandrel 11. The tang 36 on the driven member 32 (FIG. 5), meanwhile, engages the slotted portion 148 of the drive member 142, being guided thereinto by the camming surface 150 on the camming ring 149.

Figure 8B:
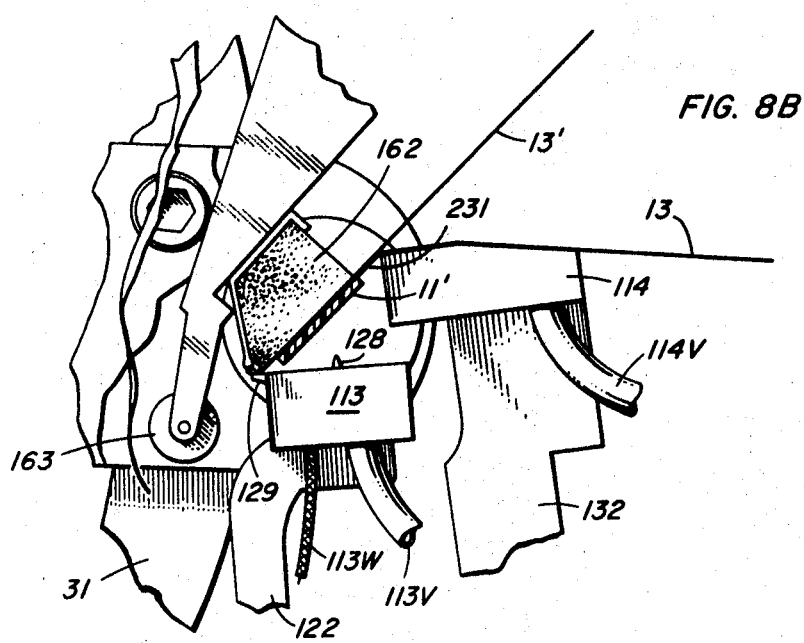

The cam 118 (FIG. 7D) now moves the vacuum head 113 quickly forward (curve 310), causing the knife 129 to sever the tape 13' between the wound mandrel 11 and the new mandrel 11' at the winding station (see also FIG. 8B). Vacuum application to the head 114 is thereupon discontinued (curve 304), and the vacuum heads 113 and 114 (curves 310, and 302 and 306) and the tape attaching mechanism 161 (curves 308 and 309) return to their initial positions (FIG. 3). Meanwhile, the motor 224 (FIG. 15) continues to rotate the limit switch control cam 225, until the control cam attains a position in which the limit switch 221 is returned to the position of FIG. 15.

The apparatus is now in condition of operation initially described above. Winding of the newly indexed mandrel 11' commences in the manner described above with reference to the mandrel 11, due to the reclosing of the limit switch 221 by the cam 225 so as to again energize the relay 222. The relay 222 again closes the contact 222–1, while opening the contact 222–2 to deenergize the motor 224.

Meanwhile, the heat sealing mechanism 191 (FIG. 3) is operated at the overwinding and heat-sealing or receiving station H. The heat sealing mechanism 191 may be of the general type disclosed in F. J. Jannett Patent No. 3,278,130. A motor 227 (FIG. 15) at the station H first winds the extra length of tape 13' over the final turn of the tape 13 on the mandrel 11. Such overwinding may begin immediately upon cessation of indexing of the turret 16 and may continue during the winding of the new mandrel 11' (curve 316). After the overwinding and prior to the next indexing operation, for example, just after the new mandrel 11' has been fully wound, a heat-sealing head 192 (FIG. 3) moves into contact with the overwound mandrel 11 (curve 315) and heat seals the end of the tape 13' to form a finished capacitor blank. The overwinding operation, an extra length of the tape 13' being wound over the tape 13, allows the heat-sealing operation to occur without risk of contacting the metallic coatings of the tapes 13 and 13' which form the plates of the capacitor. Any melting of the "Mylar" dielectric by the heat of sealing will only contact together two metallic portions of the same tape, tape 13'.

Each rotation of the cam shaft 112 indexes the turret 31 between successive stations arrayed thereabout. Simultaneously, the cam shaft 112 also rotates the chuck spread cam 207 for operating the feeding and discharging mechanism 201 (FIGS. 12 and 13). The cam 207 is rotated to move the plates 203 and 204 to the "open" position (curve 312). A wound capacitor blank is removed from the turret 31 at the discharge station D (curve 311), while a new mandrel is fed into the turret at the feeding station F (curve 313). The cam 207 then returns the plates 203 and 204 to the depicted "closed" position, retaining the new mandrel between the closing chucking plates at the feeding station F (curve 312).

The described apparatus will function to produce wound capacitors continuously by repetition of the above-described operations in performing a method according to the principles of the invention.

It is to be understood that the above-described apparatus and method are simply illustrative of one embodiment of the invention. Many modifications may be made without departing from the invention.

What is claimed is:

1. In an apparatus for winding a strand onto a plate having a pair of opposed extremities:

means mounting said plate for rotation about a first axis extending between said extremities to wind said strand onto said plate;

means having a pair of opposed extremities and mounted for rotation about a second axis parallel to said first axis for contacting said strand spaced from said plate to maintain tension in said strand; and means for rotating both said plate mounting means and said strand contacting means about said parallel axes to maintain a plane passing through the extremities of said strand contacting means continuously parallel to a plane passing through the extremities of said plate.

2. In an apparatus for winding a strip onto a mandrel greater in width than in thickness:

means for rotating said mandrel about an axis perpendicular to both said width and said thickness to wind said strip about said mandrel;

guide means having a width greater than the width of said mandrel by a predetermined amount and a thickness greater than the thickness of said mandrel by a predetermined amount; and means for rotating said guide means with said mandrel to maintain said guide means and said mandrel continuously aligned in the direction of said widths and contracting said strip to maintain a substantial constant tension in said strip.

3. An apparatus for winding a strip onto a mandrel, as set forth in claim 2, to manufacture flat articles of a desired width and thickness, wherein said guide means has a width greater than the width of said mandrel by an amount equal to one-half of the difference between the width of said mandrel and the desired article width and wherein said guide means has a thickness greater than the thickness of said mandrel by an amount equal to one-half the difference between the thickness of said mandrel and said desired article thickness.

4. In an apparatus for simultaneously winding a plurality of strips onto a mandrel having a pair of extremities:

means rotatably mounted for gripping said mandrel;

a plurality of rotatably mounted guide means, each having a pair of extremities, angularly disposed about said gripping means with planes passing through the extremities of each guide means positioned parallel to a plane passing through the extremities of said mandrel for guiding said strips onto said mandrel; and means for simultaneously rotating said gripping means and said plurality of guide means to maintain said planes passing through the extremities of said guide means parallel to said plane passing through the extremities of said mandrel.

5. In an apparatus for winding a plurality of strands of material about a flat mandrel having a pair of opposed, parallel edges;

means for rotating said mandrel about an axis intermediate said opposed edges, to wind said strands about said mandrel;

a plurality of flat guide members arranged about said mandrel, each of said guide members having opposed, parallel edges which are parallel to said edges of said mandrel, for guiding said strands onto said mandrel; and means operated by said rotating means for rotating said guide members in unison with said mandrel to maintain the flat surfaces of guide members in parallel relationship with the flat surface of said mandrel.

6. In a winding apparatus for simultaneously winding a pair of strips onto a flat mandrel, means rotatably mounted for gripping said mandrel, a first rotatably mounted guide means having a first pair of spaced guide rods mounted thereon with their longitudinal axes located in a plane parallel to the plane of said gripped flat mandrel for guiding a first strip onto said mandrel, a second rotatably mounted guide means angularly spaced from said first guide means and having a second pair of spaced guide rods mounted thereon with their longitudinal axes located in a plane parallel to the plane of said gripped flat mandrel for guiding the second strip onto said mandrel, and means for simultaneously rotating said gripping means and said first and second guide means to maintain the planes of said first and second guide rods parallel to the plane of said mandrel.

7. In an apparatus for winding capacitors, a system for maintaining a substantially constant tension in a tape being wound onto a mandrel rotated by a variable speed first motor, which comprises:

means for rotatably mounting a spool of said tape with said tape extending to the mandrel;

a shaft mounted for rotation;

a pivot arm mounted to project radially from said shaft;

means carried at an end of said pivot arm outmost from said shaft and operated by application of torque to said shaft for tensioning tape extending from said spool on said mounting means;

a second motor;

rotary drive means connected between said second motor and said pivot arm for applying a constant torque to said shaft to tension said tape;

means including a variable speed third motor for paying off said strand from said spool toward said tensioning means;

means responsive to the position of said shaft for controlling the speed of said third motor so as to follow the speed of said first motor and control the tension in said tape; and programming means, rotated with an elongated dimension thereof maintained continuously parallel to said rotating mandrel and contacting said tape between said tensioning means and said mandrel, for maintaining said tension in said tape substantially constant as said tape is wound onto the rotating mandrel.

8. In an apparatus for winding flat mandrels with strips of material;

a carrier;

a series of rotatably mounted holders spaced along said carrier for holding flat mandrels;

means for incrementally advancing said carrier to move each of said holders into a winding station;

a plurality of flat guide members arrayed in parallel relationship at said winding station for guiding said strips of material onto each advanced mandrel;

means for positioning each mandrel advanced into said winding station in parallel relationship with said flat guide members;

means rendered effective upon advance of each mandrel into said winding station for advancing said strips of material over said guide members and onto said positioned mandrel; and means for simultaneously rotating said positioned mandrel and said guide members in parallel relationship.

9. In an apparatus for winding a strip of material onto a flat, generally rectangularly shaped mandrel:
  a carrier mounted for movement through a winding station;
  a plurality of chucks spaced along the carrier and rotatably mounted thereon for holding a series of said mandrels;
  driven means including a plurality of driven members, a different driven member connected to rotate each of said chucks and each of said driven members having a tang projecting therefrom;
  a drive member positioned at said winding station having a slot formed therein to receive said tang on each driven member advanced successively to said winding station;
  a flat, generally rectangularly shaped guide member at said winding station mounted for rotation about an axis parallel to the axis of each chuck advanced to said winding station;
  means for incrementally advancing said carrier to move each of said chucks into said winding station;
  means rendered effective by the advance of the carrier for positioning each driven member to move each tang into said slot in said drive member while positioning each mandrel held by a chuck in parallel relationship to said guide member;
  means for advancing said strip of material over said guide member and onto said mandrel; and
  means for simultaneously rotating said drive member and said guide member to rotate the guide member in parallel relationship with said mandrel.

10. In an apparatus for winding two sheets of material into a blank,
  a carrier having a plurality of rotatably mounted chucks spaced therealong for holding mandrels on which the sheets of material are to be wound,
  means for incrementally advancing the carrier to successively move each chuck into a winding station and then into a receiving station,
  means for guiding a pair of sheets of material onto the mandrel in each chuck advanced to the winding station for winding the sheets of material onto the mandrel,
  means rendered effective upon each incremental advance of a chuck into the winding station for rotating the chuck a predetermined number of turns to wind said sheets of material on said mandrel in the winding station,
  a movably mounted cutter having a first blade projecting in a first direction toward the path of said first sheet of material and a second blade projecting in a second direction toward the path of movement of said chucks,
  means rendered effective upon completion of the winding of said predetermined number of turns for advancing said cutter in said first direction to move said first blade to sever said first sheet of material,
  means rendered effective upon advance of said wound mendral into said receiving station for engaging and moving said second sheet over the path of movement of the next chuck to the winding station, and
  means operated following advance of said second sheet over the path of said next chuck to the winding station for moving said cutter to move said second blade in said second direction to sever said second sheet.

11. In an apparatus for winding capacitors onto adhesive-coated mandrels:
  means for intermittently indexing successive adhesive-coated mandrels to a winding station;
  means for rotatably supporting a roll of tape with an end of the tape attached to a first adhesive-coated mandrel at the winding station;
  means for rotating the first mandrel about an axis thereof a predetermined number of times to wind a first capacitor blank thereon;
  a first vacuum head having a top surface spaced from the tape;
  means mounted on the top surface of said first vacuum head for cutting tape;
  a second vacuum head having a top surface spaced from the tape;
  means for applying vacuum to both said vacuum heads;
  means operable after the first capacitor blank is wound for moving said vacuum heads adjacent the tape, to pull the tape against said top surfaces whereupon said cutting means on said first vacuum head severs the tape to leave a tab extending from the top surface of said second vacuum head;
  means operated upon said cutting means severing the tape for withdrawing said first vacuum head from the tape;
  means operated during indexing of a second adhesive-coated mandrel to the winding station for moving the second vacuum head to contact the tab with the second adhesive-coated mandrel; and
  reaction means rendered operable by the arrival of the second mandrel at the winding station for pressing the tab against the second adhesive-coated mandrel to attach the tab thereto for winding a second capacitor on the second mandrel.

12. In an apparatus for winding capacitors, as set forth in claim 11:
  means for rotatably supporting a second roll of tape for overlapping with an end of the second tape attached to the first mandrel to wind both said tapes in overlapping arrangement as the first mandrel is rotated;
  means mounting said reaction means for extending the second tape across the winding station to extend over the tab as the second mandrel is indexed to the winding station;
  means mounted on said first vacuum head for cutting the second tape adjacent the second mandrel across the second mandrel from said second tape roll supporting means; and
  means, actuated upon indexing of the second adhesive-coated mandrel to arrive at said winding station, for moving said first vacuum head to sever the second tape as said reaction means attaches both the tab and the second tape to the second adhesive-coated mandrel.

13. In a method of advancing a strip over a guide member and winding the strip onto a plate having a shape conforming to the guide member, the steps of:
  rotating the plate about an axis thereof to wind the strip thereon and tension the strip, and simultaneously
  rotating the guiding member about a parallel axis in continuous contact with the tensioned strip and with the guiding member maintained continuously parallel to the plate.

14. In a method of winding a pair of strips of material onto a plate, the steps of:
  rotating the plate about an axis thereof to wind the strips thereon and tension the strips, simultaneously
  rotating a first guiding member of a conforming shape in unison with and continuously parallel to the plate while continuously contacting with a first tensioned strip, and simultaneously
  rotating a second guiding member of conforming shape in unison with and continuously parallel to the plate and first guiding member while continuously contacting a second tensioned strip.

15. In a method of winding a capacitor blank about a mandrel,
  rotating said mandrel in a first winding station a predetermined number of turns to wind a pair of sheets of material,
  severing the first of said sheets after said predetermined turns have been wound,

17 advancing the wound mandrel to a second winding station with the second sheet trailing behind,
engaging said trailing section of said second sheet and moving it back to the first winding station,
severing the section of second sheet moved back to the first station, and then
rotating the mandrel in the second station to wind said severed, trailing section of said second sheet about said mandrel.

References Cited

UNITED STATES PATENTS 3,201,056 8/1965 Fanning _____ 242—56.1
3,227,383 1/1966 Zywietz _____ 242—7.13
3,314,619 4/1967 Kerstetter _____ 242—7.13
3,350,255 10/1967 Twigg _____ 242—56.1 XR

FOREIGN PATENTS 810,959 3/1959 Great Britain.
569,233 11/1957 Italy.

MERVIN STEIN, Primary Examiner
W. H. SCHROEDER, Assistant Examiner

U.S. Cl. X.R.

29—25.42; 242—7.13, 75, 76